United States Patent
Liu et al.

(10) Patent No.: US 9,826,414 B2
(45) Date of Patent: Nov. 21, 2017

(54) CELLULAR BACKHAUL COVERAGE ALGORITHMS

(71) Applicant: T-Mobile USA, Inc., Bellevue, WA (US)

(72) Inventors: Chunming Liu, Sammamish, WA (US); Michael D. Taylor, Frisco, TX (US); Bryan Fleming, Sammamish, WA (US); David Arthur Mayo, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/982,581

(22) Filed: Dec. 29, 2015

(65) Prior Publication Data

US 2017/0105126 A1  Apr. 13, 2017

Related U.S. Application Data

(60) Provisional application No. 62/240,374, filed on Oct. 12, 2015.

(51) Int. Cl.
| | |
|---|---|
| *H04W 16/24* | (2009.01) |
| *H04W 84/18* | (2009.01) |
| *H04W 16/18* | (2009.01) |
| *H04W 24/02* | (2009.01) |
| *H04L 12/705* | (2013.01) |

(52) U.S. Cl.
CPC .......... *H04W 16/24* (2013.01); *H04W 16/18* (2013.01); *H04W 24/02* (2013.01); *H04L 45/18* (2013.01); *H04W 84/18* (2013.01)

(58) Field of Classification Search
CPC ..... H04L 43/0852; H04L 45/28; H04L 45/12; H04L 12/462; H04L 49/351; H04B 7/0408; H04W 16/24
See application file for complete search history.

(56) References Cited

U.S. PATENT DOCUMENTS

| | | | |
|---|---|---|---|
| 8,355,348 B1 * | 1/2013 | Miller | H04L 12/462 370/256 |
| 8,385,921 B1 | 2/2013 | Shousterman et al. | |
| 2007/0070959 A1 | 3/2007 | Almeroth et al. | |
| 2007/0242602 A1 | 10/2007 | Pang et al. | |
| 2009/0257380 A1 | 10/2009 | Meier | |
| 2014/0192677 A1 | 7/2014 | Chew et al. | |

(Continued)

OTHER PUBLICATIONS

Computing for rural empowerment: Enabled by last-mile telecommunication dated Sep. 30, 2013.*

(Continued)

*Primary Examiner* — Nizar Sivji
(74) *Attorney, Agent, or Firm* — Lee & Hayes, PLLC

(57) ABSTRACT

Systems and methods for designing cellular backhaul networks are disclosed. The system can include an Adaptive Graph Minimum Spanning Tree (AG-MST) algorithm to identify and connect stranded cellular sites at minimum cost. The system can compare pending bids for new connections such as, for example, new microwave or fiber optic links at stranded sites to provide new connectivity. The system can design a network that connects the maximum number of stranded sites at the minimum average cost per site.

18 Claims, 23 Drawing Sheets

(56) References Cited

U.S. PATENT DOCUMENTS

| | | | | |
|---|---|---|---|---|
| 2015/0023155 A1* | 1/2015 | Shanmugavadivel | .. | H04L 45/28 370/225 |
| 2015/0230105 A1* | 8/2015 | Negus | ............. | H04B 7/0408 370/329 |
| 2016/0072604 A1* | 3/2016 | Zhao | ............. | H04L 49/351 370/503 |
| 2016/0373330 A1* | 12/2016 | Pace | ............. | H04L 43/0852 |
| 2016/0380877 A1* | 12/2016 | Allan | ............. | H04L 45/12 370/256 |

OTHER PUBLICATIONS

5G Wireless Backhaul networks: Challenges and research advances dated Dec. 2014.*

PCT Search Report and Written Opinion dated Jan. 24, 2017 for PCT Application No. PCT/US16/55507, 10 pages.

* cited by examiner

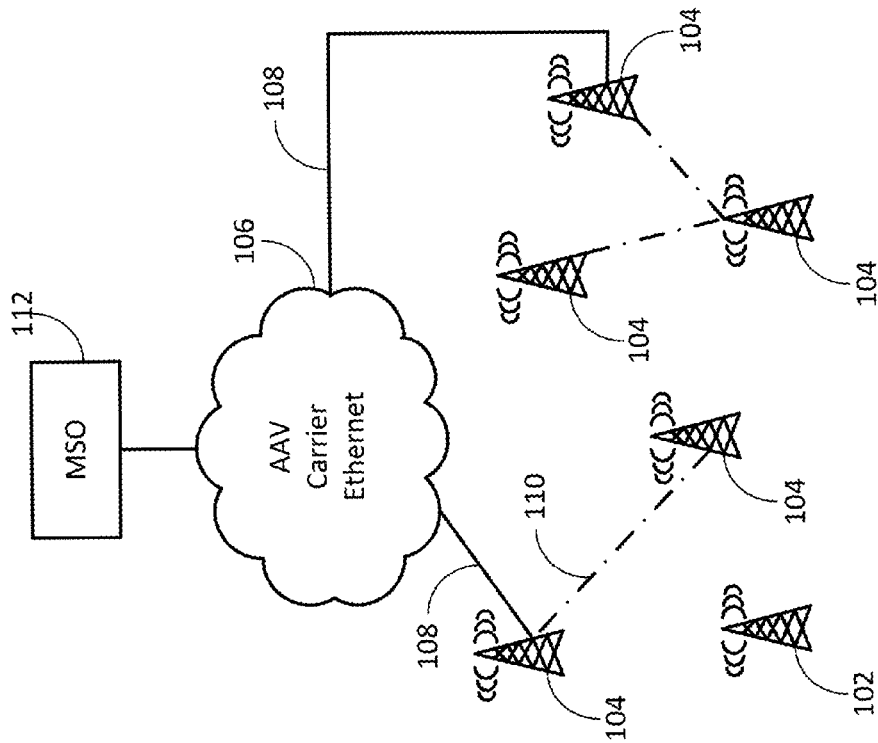
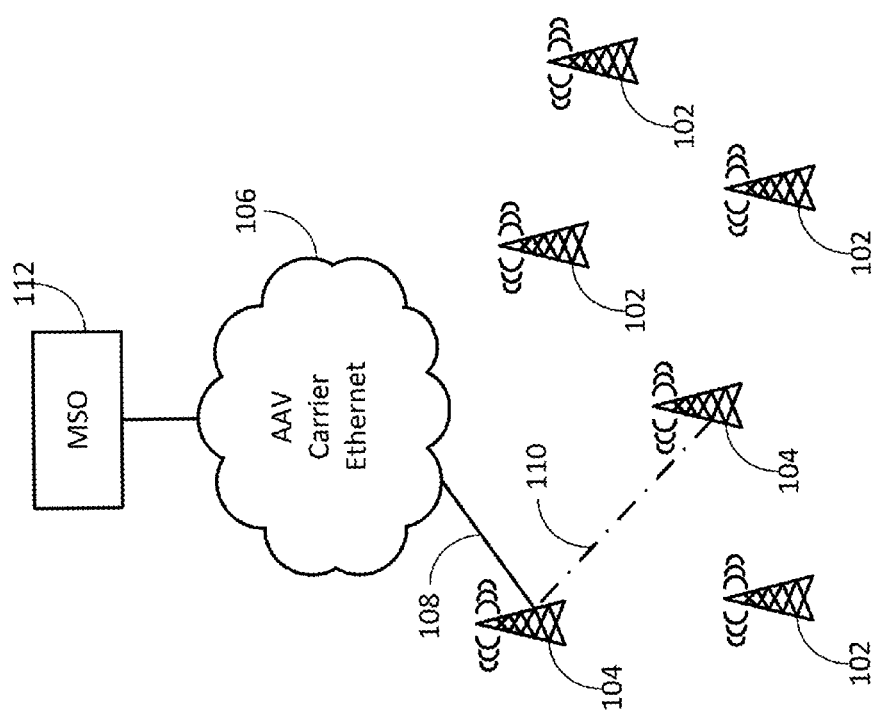

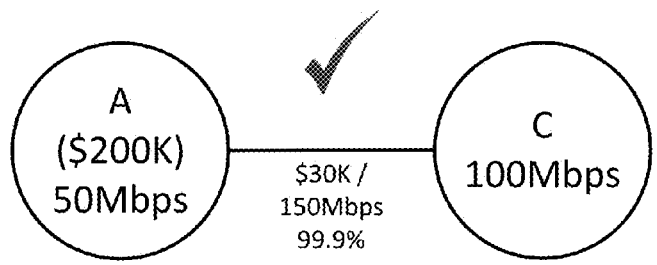
Fig. 12A
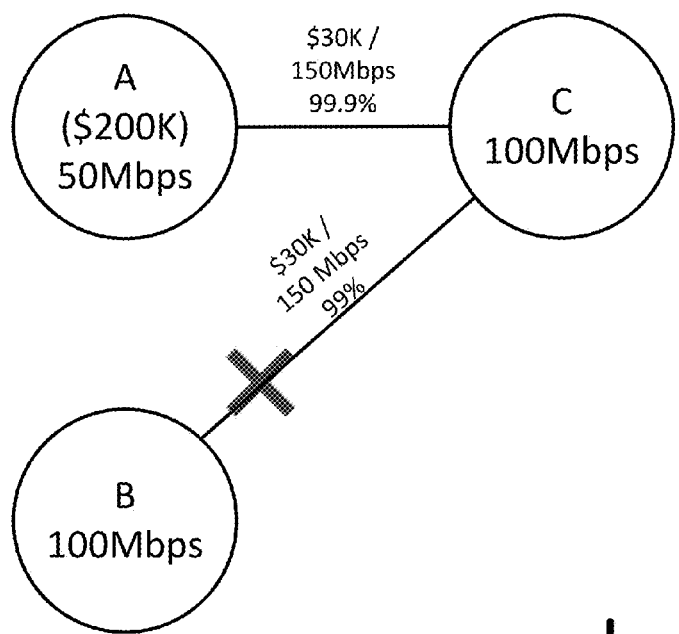
Fig. 12B
To
Fig. 12C

CELLULAR BACKHAUL COVERAGE ALGORITHMS

CROSS-REFERENCE TO RELATED APPLICATIONS

The application claims priority to, and benefit under 35 U.S.C. §119(e) of, U.S. Provisional Application No. 62/240,374, entitled "Last-Mile Cellular Backhaul Coverage Algorithms", filed Oct. 12, 2015, which is incorporated herein by reference as if fully set forth below.

BACKGROUND

A variety of means can be used to connect remote cellular communications sites ("cell towers") with a core, or "backbone," cellular network to provide voice and data connectivity, among other things. Cellular service providers can use alternative access vendor (AAV) networks, for example, which utilize Ethernet networks to meet needs of backhaul for broadband cellular services, such as long term evolution (LTE) networks, and to support the addition of new cell sites to provide additional bandwidth and/or additional wireless coverage.

Providers can use fiber optic cable, for example, to connect many cell sites to mobile switching offices (MSOs) over carrier networks for cellular backhaul. In other cases, for sites that lack direct fiber connectivity, microwave wireless backhaul can be used, for example, to connect a cell site to a nearby site that does have AAV fiber connectivity. Microwave transmission can be cost-effective and can generally be rapidly deployed to provide cellular backhaul.

Due to the complexity and size of modern cellular networks, however, it can be difficult to determine a cost effective means for connecting "stranded" sites, discussed below, to an appropriate conduit for cellular backhaul. Embodiments of the present disclosure relate to finding an efficient way to provide last-mile backhaul to stranded sites with minimum cost.

BRIEF DESCRIPTION OF THE DRAWINGS

FIGS. 2A and 2B depict two possible backhaul topology and scenarios, in accordance with some examples of the present disclosure.

FIGS. 12A-12C depict an adjusted multiple spanning tree (MST) with a starting point at site A (first round), in accordance with some examples of the present disclosure.

DETAILED DESCRIPTION

Examples of the present disclosure relate to systems and methods for determining an efficient Ethernet backhaul solution for stranded cellular sites. The system can include novel algorithms, or Adaptive Graph Minimum Spanning Tree (AG-MST), which can maximize backhaul coverage, while reducing backhaul cost. The system can enable multiple backhaul solutions to be explored for an entire network, or section of network, that, due to network size and complexity could not be previously be analyzed. In other words, the size and complexity of the typical cellular network creates such a large number of combinations and permutations that conventional methods are impractical, or impossible, without an efficient algorithm implemented in a computing environment. A person working by hand, for example, cannot possibly analyze all possible backhaul solutions. As discussed below, to maximize the possible number of solutions, the solutions can include microwave links with Line-of-Sight (LoS), near line-of-site (nLoS), and non-line-of-sight (NLoS) connectivity.

Cell towers are ubiquitous and receive cellular voice and data from mobile phones and other mobile devices and then relay this information to and from the larger cellular network. As the use of cellular data has grown, so has the need to connect cell towers to the cellular network using suitable connections. In many cases alternative access vendors (AAVs) can be used for this purpose. AAVs comprise providers that use fiber optic, coaxial, or other connections to provide a particular service (e.g., internet or cable television), but that also have surplus network capacity. Cell towers can be connected to an AAV carrier Ethernet connection, for example, to provide cellular backhaul services from the tower to the cellular backbone network.

Figure 1:
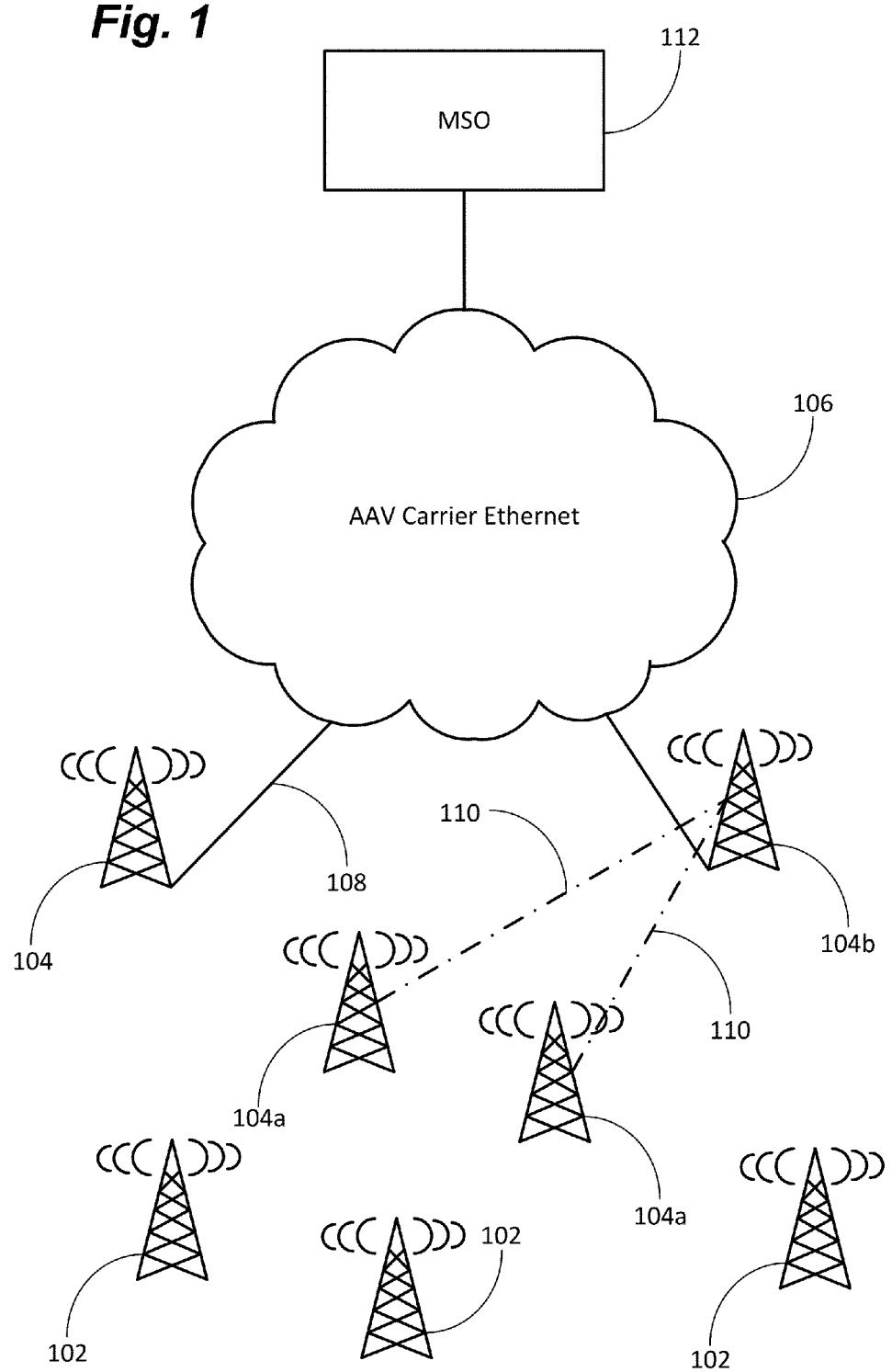
FIG. 1 depicts AAV sites and stranded sites, in accordance with some examples of the present disclosure.

The need for cellular backhaul has increased dramatically as the number of mobile devices and the use of cellular data services has increased. As shown in FIG. 1, however, some cell towers have no direct data connection to network components and thus, can be considered "stranded." In other words, stranded sites 102 may have a sufficient connection to provide cellular voice services, but no ability to carry large amounts of data. In the areas around these stranded sites 102, therefore, users may be unable to access cellular data services.

A number of additional connections can be provided to these stranded sites 102 to enable cellular backhaul. In some cases, for example, the stranded sites 102 can be connected to sites that do have a connection to the network, or connected sites 104, which have existing fiber, or other data, connections. As shown, these connected sites 104 can be connected via an AAV carrier Ethernet connection 106 via a fiber optic, coaxial, or other high speed data connection 108. In other cases, a first connected site 104a may be connected to a second connected site 104b via a wireless connection 110 (e.g., a microwave link), for example, and the second connected 104b can, in turn, be connected to the AAV 106 via a fiber optic data connection. The AAV 106 can ultimately connect the sites 102, 104 to a mobile switching office (MSO) for routing through the backbone network.

These same connections (i.e., wired or wireless connections) can be used to connect the stranded sites 102 for cellular data backhaul. In a network with thousands of cell sites 102, 104 and myriad available AAV connections 106, however, it can be difficult or impossible to determine the most efficient means of connecting all, or most, of the stranded sites 102 to an appropriate backhaul solution. The sheer number of combinations and permutations means that this process lends itself to computer algorithms.

As shown in FIGS. 2A-3B, each stranded site 102 can be connected directly to an AAV 106 using a new fiber optic cable 108. Of course, the stranded site 102 could also be connected by a coaxial, T1, T3, or other suitable high-speed connection. Regardless of the connection type, however, the installation of a new connection may involve installing a new cable, fiber, satellite dish, microwave transceiver, or other equipment, and can involve considerable cost and time. The cost of installation can vary widely based on the distance from the stranded site 102 to the AAV 106, for example, where longer distances may require the installation of longer cables or more powerful transceivers, for example. Installation costs may also vary due to the terrain at the stranded site 102. Installation in mountainous locations, for example, may be much more expensive than an installation on flat ground or in a city.

On the other hand, a new high-speed data connection may enable a previously stranded site 102 to be connected to an AAV 106 and to act as a hub 210 for additional stranded sites 102. These stranded sites 102 can be connected to the hub 210 using a microwave connection, for example, or other suitable wired or wireless connection. Of course, this solution is limited by the bandwidth available over the connection between the stranded site 102 and the hub 210. In addition, the site acting as a hub 210 may also have a limited amount of bandwidth, thus limiting the number of stranded sites 102 that can connect to the AAV 106 via the hub 210.

Based on a stranded site 102 location, therefore, mesh networking technology can be used to find multiple possible microwave links among nearby sites. Geographic Information Services (GIS) and other terrain and location information systems can be used to search hub sites 210 that can provide a connection between one or more stranded sites 102 and an existing AAV 106. Examples of the present disclosure, therefore, can comprise an Adaptive Graph Minimum Spanning Tree Algorithm (AG-MST), which can be constructed to identify different starting stranded site 102 locations (i.e., locations that can act as hubs 210), specify adjusted microwave backhaul graph sizes, and derive a cluster-based backhaul cost with a search algorithm. The system can determine a minimum spanning tree, in which each link state can be adjusted to satisfy both capacity and end-to-end availability. The microwave backhaul networks with maximum coverage can be identified to produce a final network backhaul topology plan. The system can also combine traditional microwave backhaul design with a mesh networking optimization engine to provide an automated process to configure one or more backhaul solutions based on minimum cost with maximum coverage, among other things.

Stranded Site Backhaul Planning

Backhaul Topology Scenario

As shown in FIGS. 2A-2D, in addition to the complexity of configuring a modern cellular network, there are at least four solutions to connect stranded sites 102 to provide cellular backhaul:

1) Point-to-Point (P2P) Microwave Backhaul

As shown in FIG. 2A, microwave backhaul feasibility can be evaluated from a stranded site to existing AAV sites or contracted sites that have Ethernet fiber connectivity. This may include adjusting cell site infrastructure height to support a P2P LoS, nLoS, or NLoS microwave link (i.e., increasing or decreasing the height of a cell tower, for example, to avoid LoS obstacles). The cost associated with a new microwave link, including non-recurring costs (NRC) and monthly recurring costs (MRC), is denoted as C_MW.

2) New AAV Hub Site Construction

As shown in FIG. 2B, a vendor bid can be accepted on new fiber optic cable construction on one or more stranded sites. The cost associated with the fiber construction is denoted as C_Hub. Considering the higher cost of fiber construction vs. microwave backhaul, however, the new fiber site can be taken as a hub and connect to nearby stranded sites with P2P (e.g., LoS, nLoS, or NLoS) microwave links, as discussed above. In this configuration, the backhaul coverage is maximized and average backhaul cost per stranded site is reduced.

3) Relay Site with Microwave Backhaul

Figure 3B:
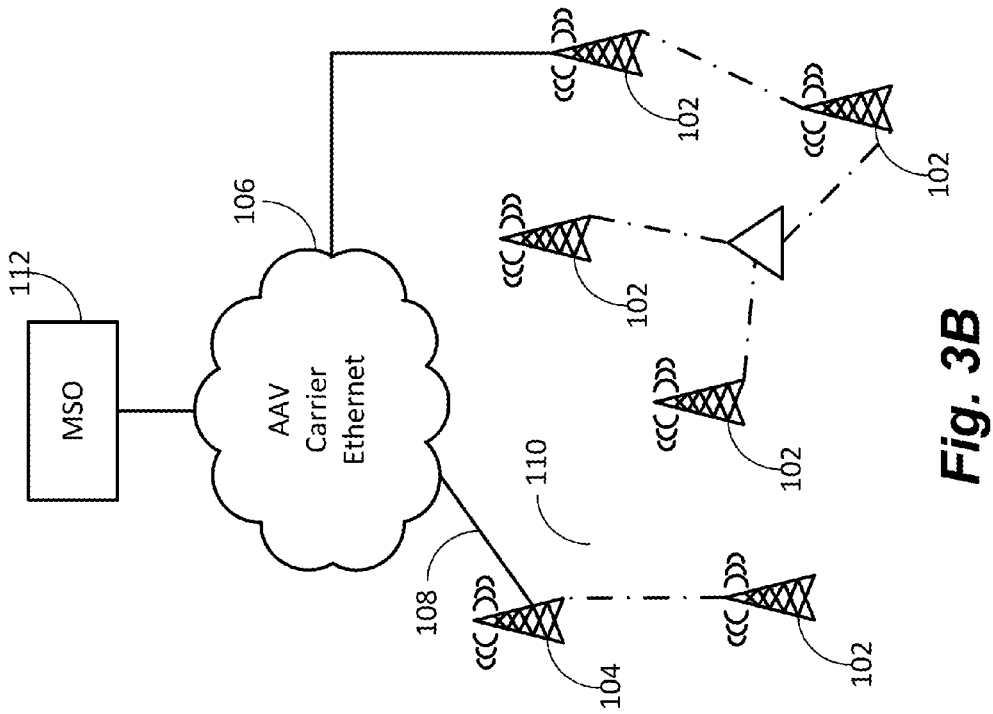
FIGS. 3A and 3B depict two additional possible backhaul topology and scenarios, in accordance with some examples of the present disclosure.
Figure 3A:
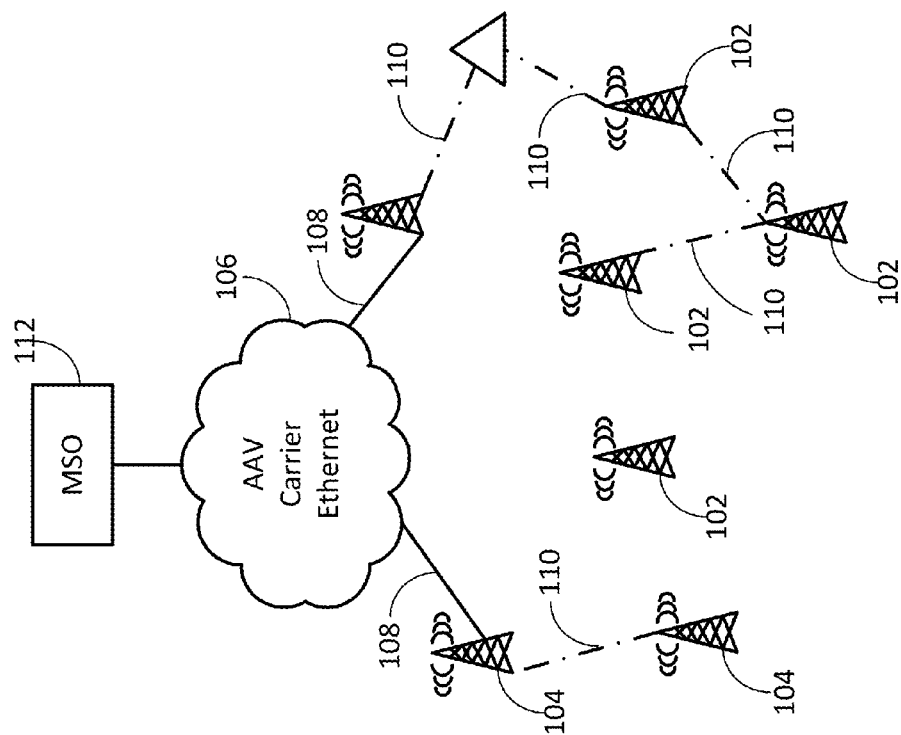

Some stranded sites can connect to AAV sites via nearby microwave infrastructure, such as third-party buildings, site towers, etc. that have microwave links, as shown in FIG. 3A. Such infrastructure can be regarded as a relay site, and the related cost can be denoted as C_Relay. To maximize coverage, other stranded sites can adopt microwave links to the stranded site which, in turn, can connect to a relay site (making the stranded site a relay site).

4) Hybrid Solution with New Hub Site and Relay Site

In some cases, to get all stranded sites connected, it may be preferable to order new fiber hub construction at one or more stranded sites and to use one or more relay sites as necessary, as shown in FIG. 3B.

Backhaul Cost Metrics

Generally, there are at least two types of cost for a cellular backhaul configuration: MRC and NRC. MRCs can include, for example, AAV bandwidth leasing, tower space rental, energy, and maintenance fees. NRCs, on the other hand, can comprise, for example, material transportation, fiber construction, site configuration/installation, FCC licensing, and microwave radio equipment.

The backhaul cost of a site i (e.g., a hub site or relay site) over t months can be denoted as:

$$\text{Cost\_site}(i) = NRC(i) + t \ast MRC(i)$$

The backhaul cost of a link j (e.g., microwave or fiber) over t months can be denoted as:

Cost_Link(j)=NRC(j)+t*MRC(j)

So the total backhaul cost of a stranded site cluster k, which contains a total of M sites and N links, can be shown as:

Cost_Cluster(k)=$\Sigma_{i=1}^{M}$Cost_Site(i)+$\Sigma_{j=1}^{N}$Cost_Link(j)

where M and N are the total number of stranded sites and microwave links in the cluster respectively, and t is the number of months.

Microwave Link Modeling and Capacity

Figure 4A:
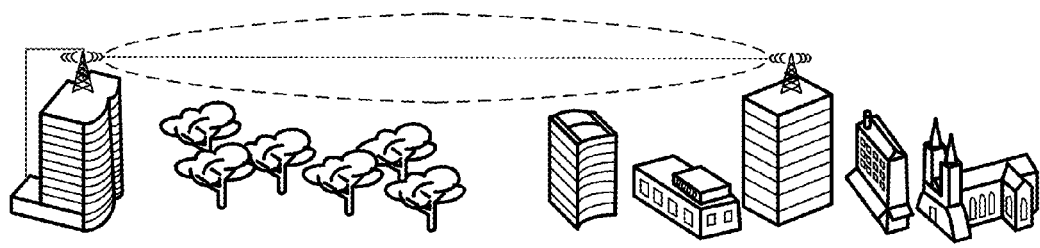
FIGS. 4A, 4B, and 4C depict line-of-site (LoS), near-line-of-site (nLoS) and non-line-of-site (NLoS) wireless connections, in accordance with some examples of the present disclosure.
Figure 4B:
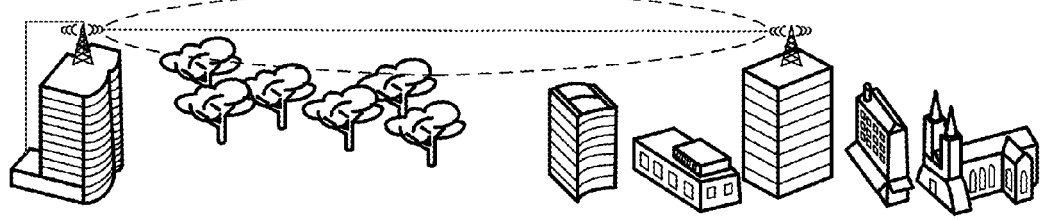
Figure 4C:
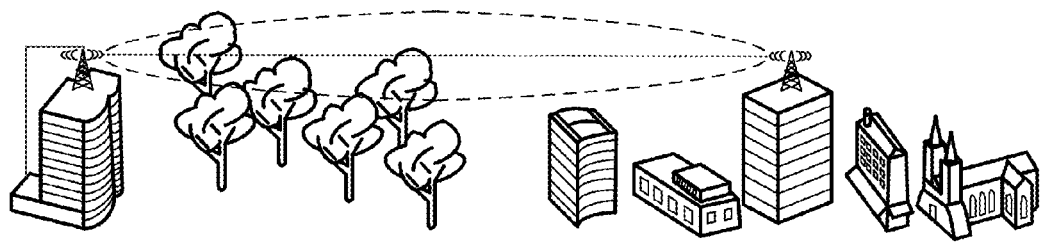

As shown in FIGS. 4A-4C, a microwave backhaul link generally refers to terrestrial, point-to-point digital radio communications, often deploying highly directional antennas and operating in licensed frequency bands. There are three basic types of links, depending on the level of LoS propagation available between two sites: LoS (FIG. 4A), nLoS (FIG. 4B), and NLoS (FIG. 4C).

As shown in FIGS. 4A-4C, microwave signals travel along sight lines, but also spread as they propagate. As a result, both the linear, or visual, line-of-sight, and the area covered by the signal are of significance. The area that the signal covers as it spreads out is referred to as the Fresnel zone, which is generally required to be clear and free of obstructions to be considered true LoS.

As shown in FIG. 4A, therefore, LoS locations have both an unobstructed linear pathway 405 between sites and an unobstructed Fresnel zone 410. As shown in FIG. 4B, nLoS sites, on the other hand, have an unobstructed linear pathway 405, but a Fresnel zone 410 that is at least partially obstructed. Finally, as shown in FIG. 4C, for NLoS sites, both the linear pathway 405 and Fresnel zone 410 are at least partially obstructed. The obstructions in either case can be, for example, trees, mountains, buildings, or other large objects that substantially block the propagation of the microwave signal.

Line-of-Sight Microwave Link Modeling

Using Shannon's capacity formula, the upper bound for a microwave channel capacity C in bits per second (bps) is determined by:

$$C = B \times \log_2\left(1 + \frac{S}{N}\right)$$

where B is channel bandwidth in Hz, and S/N is the signal-to-noise ratio. S is the received signal strength in watts at a receiver antenna, and N is noise in watts at the receiver.

Receiver noise N can be further calculated as:

N=K×T×B where K is the Boltzmann's constant (1.38×10$^{-23}$ J/K), T is system temperature (assumed as 290K, or room temperature), and B is channel bandwidth in Hz.

For a microwave link with clear line-of-sight, the received signal level, S, can be determined as:

S=$P_{TX}$−$L_{TX}$+$G_{TX}$−$L_{PL}$+$G_{RX}$−$L_{RX}$ where S is received signal level in dBm, $P_{TX}$ is transmitter output power in dBm, $L_{TX}$ represents transmitter losses (e.g., losses from circulators, lines, connectors, radome, etc.) in dB, $G_{TX}$ is transmitter antenna gain in dB$_i$, $L_{PL}$ is total path loss (free space) in dB, GRX is receiver antenna gain (dB$_i$), and $L_{RX}$=receiver losses (again, losses from circulators, lines, connectors, radome, and the like) in dB.

Microwave links generally adopt adaptive modulation to maximize channel bandwidth efficiency. The link capacity, therefore, can be determined by channel band in Hz and modulation efficiency as shown in Table 1.

TABLE 1

| Modulation Efficiency | |
|---|---|
| Modulation Scheme | Bandwidth Efficiency |
| QPSK | 2 bps/Hz |
| 16-QAM | 4 bps/Hz |
| 32-QAM | 5 bps/Hz |
| 64-QAM | 6 bps/Hz |
| 128-QAM | 7 bps/Hz |
| 256-QAM | 8 bps/Hz |

Figure 5:
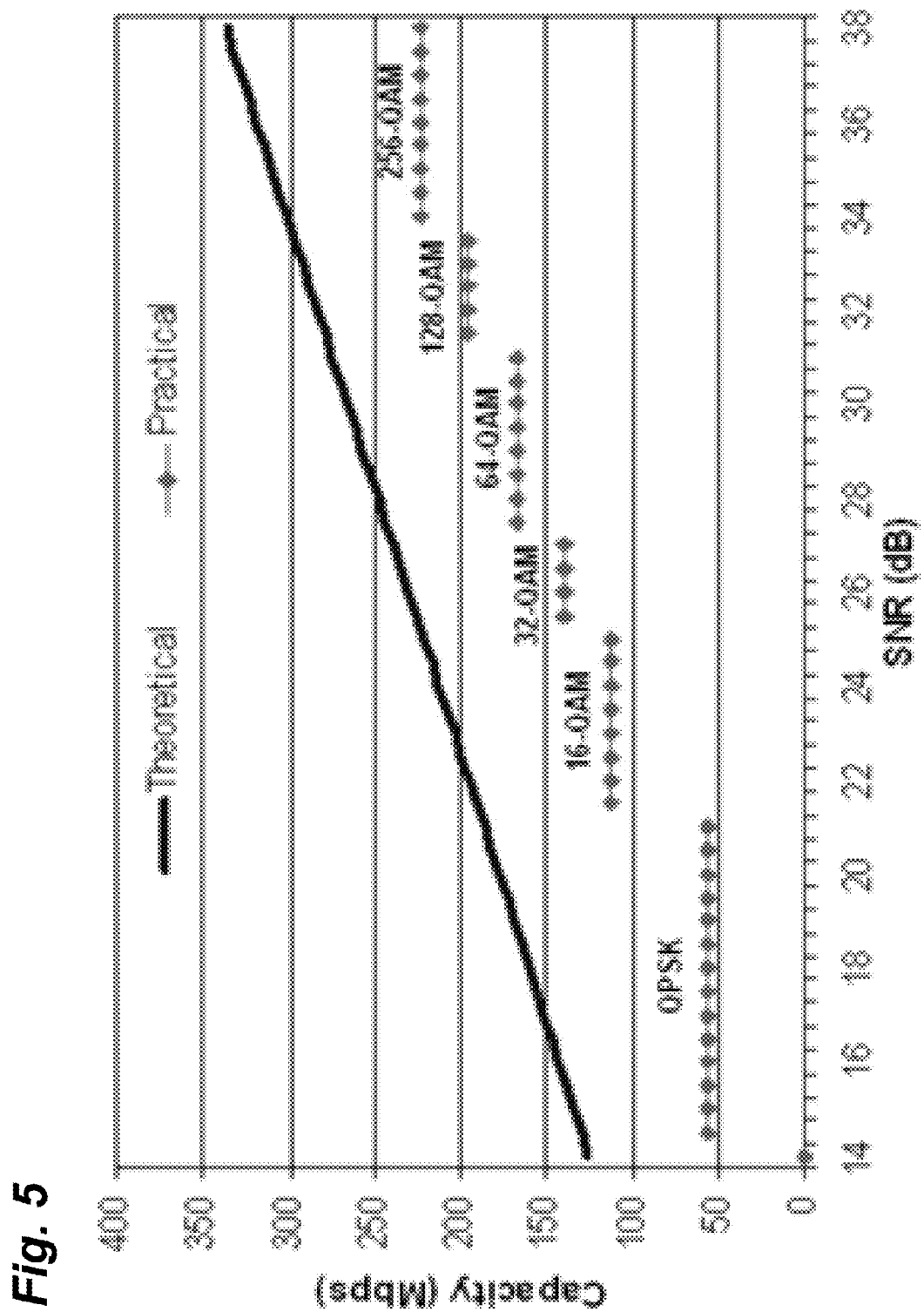
FIG. 5 is a graph depicting microwave channel capacity with adaptive modulation, in accordance with some examples of the present disclosure.

In practice, however, the modulation scheme is generally chosen for a certain signal-to-noise ratio (SNR) range, as shown in FIG. 5. If the received SNR is between 21.5 dB and 25 dB, for example, the modulation is 16-QAM, which means the bandwidth efficiency for modulation at 16-QAM is 4 bps/Hz. If the channel bandwidth is 30 MHz, for example, then the channel capacity after modulation will be modulation efficiency multiplying channel bandwidth, as 4 bps/Hz×30 MHz=120 Mbps.

Figure 6:
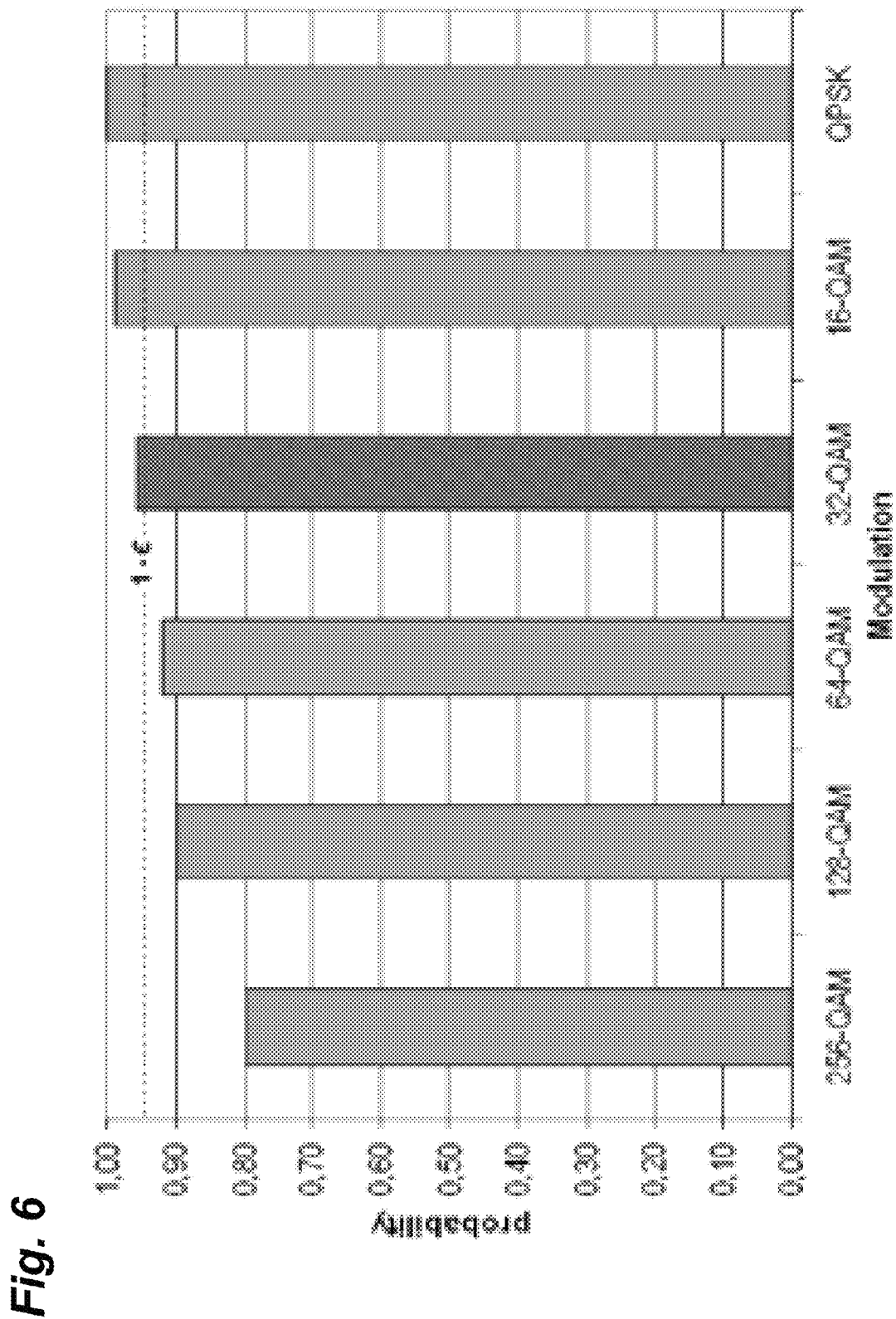
FIG. 6 is a bar chart depicting cumulative probability distribution function, in accordance with some examples of the present disclosure.

The cumulative probability distribution (CDF) function of each modulation can be further derived and is shown in FIG. 6. The expected microwave link capacity function can then be expressed as:

P{B×$M_e$≥$C_t$}≥(1−ϵ)

where B is the microwave channel bandwidth in Hz, $M_e$ is the expected modulation efficiency, $C_t$ is the target required capacity, and ϵ is the outage threshold value. In this case, ϵ can be approximated as the link availability, A, or the percentage of "up-time" for the link. This number is commonly 99%, or greater, due to the high reliability of modern electronics. Then a CDF function can be used to derive an inverse function to obtain the target modulation efficiency, $M_e$:

$M_e$=$F^{-1}${P{B×$M_e$≥$C_t$}≥(1−ϵ)}

$M_e$, in turn, can be used to calculate expected channel capacity. As a result, the expected microwave link capacity for a LoS site is $C_{mw}$=B×$M_e$. Because E can be approximated with the link availability, however, the microwave link status can be obtained as {$C_i$, $M_i$, $A_i$}, where C represents the link capacity (e.g., in Mbps), $M_i$ is the modulation scheme (e.g., 16-QAM or 64-QAM), and $A_i$ is the link availability (e.g., 0.99 or 0.9995).

nLoS and NLoS Microwave Link Modeling nLoS and NLoS scenarios for a P2P microwave link are somewhat more complex. Various factors such as, for example, the obstruction size, multipath propagation, reflection, penetration, and diffraction can affect link performance and capacity. Generally, the capacity, $C_x$, of an nLoS or NLoS microwave link, x, can be expressed as a function of the link availability, $A_x$, the distance of the link, $D_x$, and the channel bandwidth of the link, $B_x$, as follows:

$C_x$=F{$A_x$,$D_x$,$B_x$}

Figure 7:
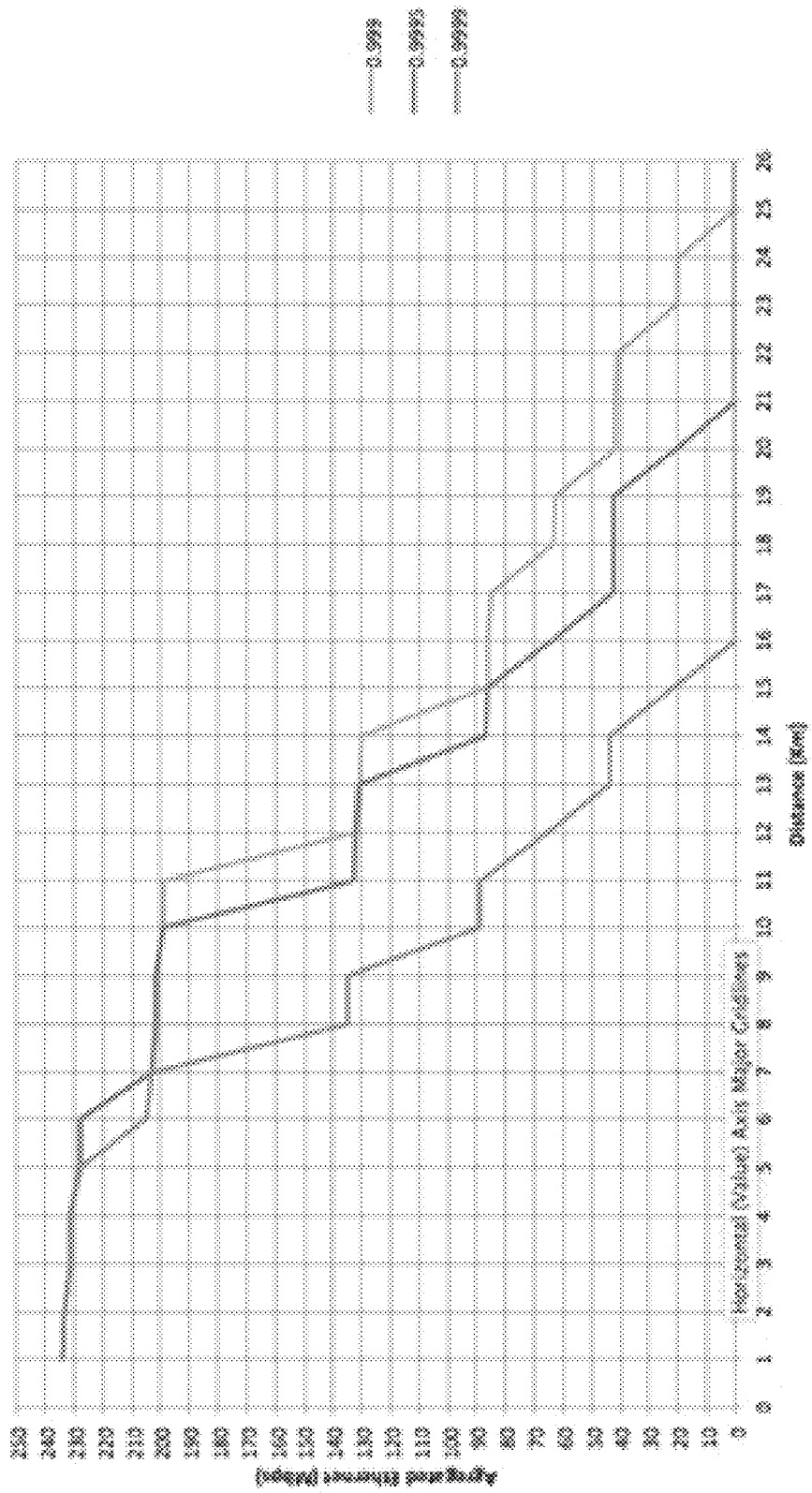
FIG. 7 is a graph comparing bandwidth capacity, distance, and availability for microwave data transmission, in accordance with some examples of the present disclosure.

As shown in FIG. 7, for example, for a vendor equipment with channel bandwidth 40 MHz, the capacity (i.e., total aggregated Ethernet capacity in Mbps) decreases when the link availability increases (from 0.999, 0.9995, to 0.9999). The capacity also decreases when link distance increases. Thus, the performance metrics of the microwave equipment can be used to estimate the link capacity for nLoS and NLOS scenarios.

As shown in Table 2, given a fixed distance (e.g., 14 miles) and using availability vs. capacity metrics for nLoS and NLOS, the link capacity is generally decreasing as link availability increases. Such metrics can be obtained from empirical field trials or can sometimes be obtained from product key performance indicator (KPI) metrics provided by the vendor.

TABLE 2

Microwave Link Capacity vs. Availability

| Availability | Link Capacity (Mbps) | Modulation |
|---|---|---|
| 99.99% | 42 | 8-QAM |
| 99.95% | 88 | 16-QAM |
| 99.9% | 120 | 32-QAM |

As a result, nLoS and NLOS link status can also expressed as $\{C_l, M_l, A_l\}$. In other words, link $L_l$ (with nLoS or NLOS) can achieve $C_l$ capacity with Modulation $M_l$, at Availability $A_l$.

Relay Site and Connection Policy

Figure 8:
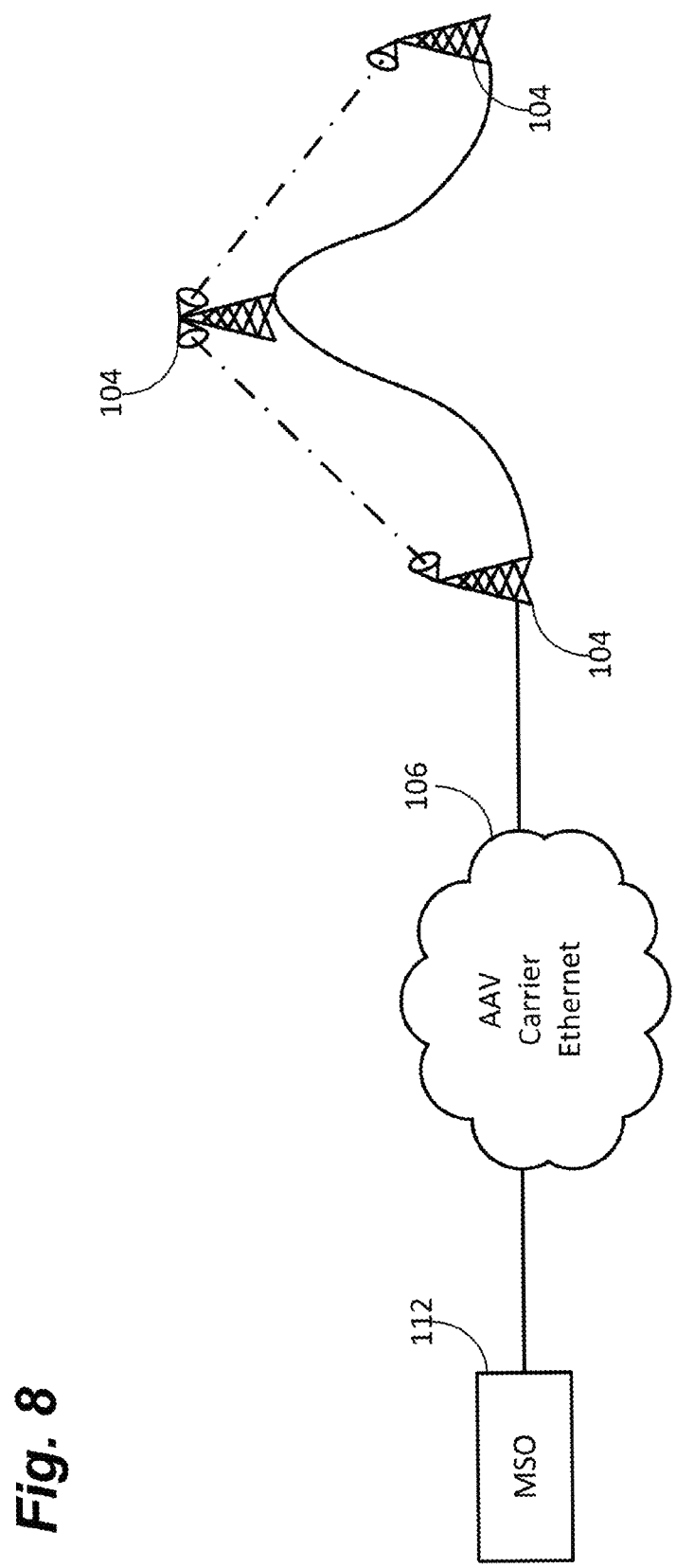
FIG. 8 depicts an example of a relay site, in accordance with some examples of the present disclosure.

As shown in FIG. 8, a relay site 802 can be defined as a site with the infrastructure necessary to connect one or more stranded sites 804 to an existing AAV site 806 (and then to an MSO 808) through one or more microwave 810 or fiber 812 links. A relay site 802 can sometimes be located on third-party infrastructure, such as, for example, third-party buildings, towers, and trees. The height of the site can improve LoS/nLoS/NLoS, enabling a microwave link 810 to connect the relay site 802 to one or more nearby stranded sites 804 and one or more AAV sites 806. It is also possible to install one or more microwave radios on existing sites to provide microwave links to nearby sites. The third-party owner can charge the provider for the space and utilities, which can be denoted as microwave link cost for new links. Some exemplary relay site info is shown below in which the latitude, longitude, and structure height is provided, among other things:

in which microwave link feasibility is evaluated first. If possible, the link capacity can then be derived to determine whether a relay site 802 is sufficient to support backhaul traffic. To reduce cost, the relay policy can be set to use the minimum number of relay sites 802 to connect the maximum number of stranded sites 804.

Building a Mesh Networking Graph with Weights

Figure 9:
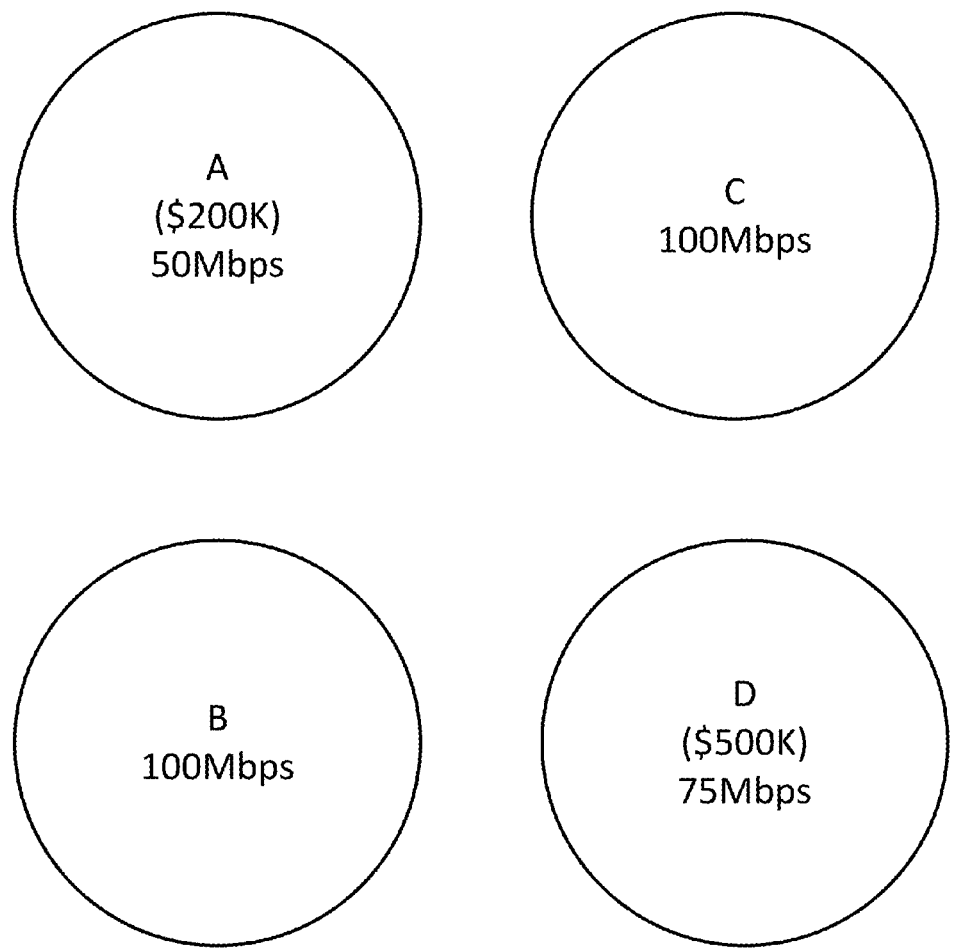
FIG. 9 depicts a cost-weighted stranded site cluster, in accordance with some examples of the present disclosure.

As shown in FIG. 9, in a four stranded site cluster {A, B, C, D}, site A and site D can be selected as new hub sites with new construction costs. In this case, a vendor has provided a bid stating that it will cost the provider $200K for new fiber connectivity at site A and $500K for site D. Backhaul capacity requirements and Committed Information Rate (CIR) can also be provided for each site. In some cases, there may be no vendor bids to provide new microwave or fiber connections. In this case, such as for sites B and C, no vendor price is associated with that site.

Figure 10:
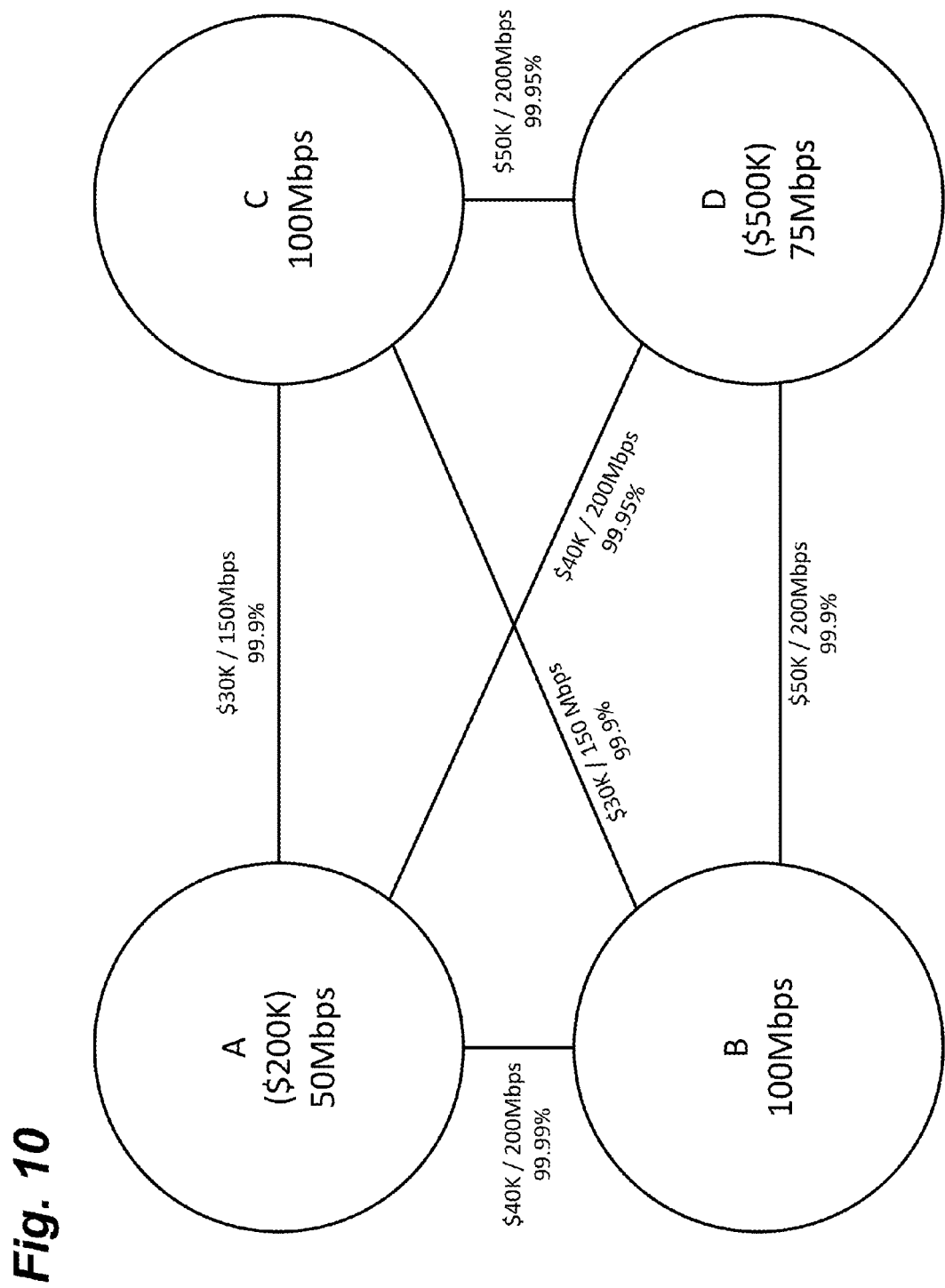
FIG. 10 depicts a weighted microwave mesh network, in accordance with some examples of the present disclosure.

A full mesh microwave link evaluation—including LoS, nLoS, and NLoS solutions—and cost estimation can then be calculated among these stranded sites. The calculations can include both the estimated link cost and the maximum predicted link capacity of the microwave link from wireless modeling for each type of connection (e.g., LoS, nLoS, and NLoS), discussed below. Each microwave link can be measured using metrics $\{C_l, M_l, A_l\}$. The mesh network can be shown in FIG. 10.

Each microwave link can be associated with at least three parameters—cost, link capacity, and availability. There is an nLoS link between site A and site C, for example, with a cost of $30K, a maximum capacity of 150 Mbps, and an availability of 99.9%. There is also a LoS link between site A and site B with a cost of $40K, a maximum capacity of 200 Mbps, and an availability of 99.99%.

Figure 11:
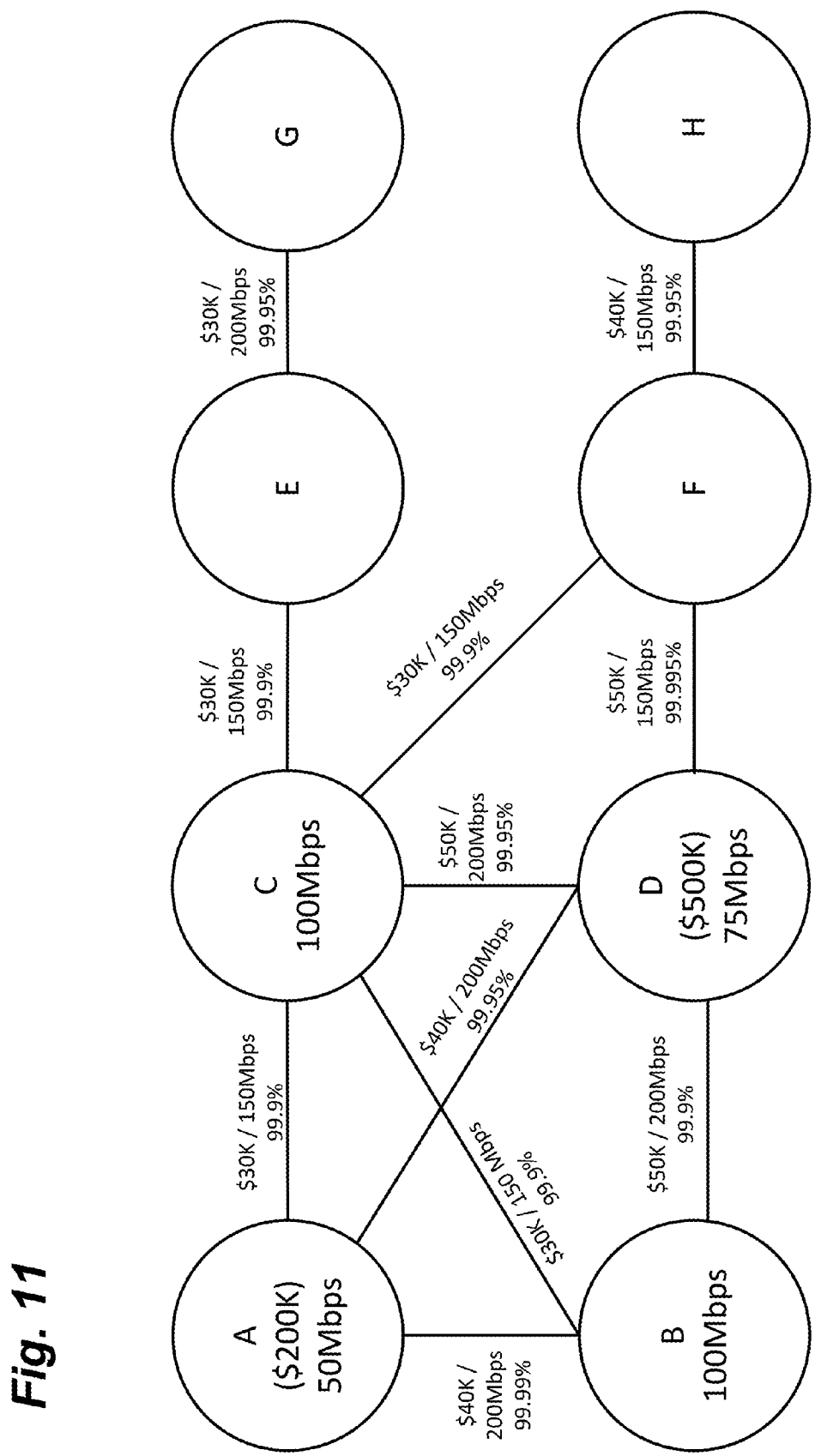
FIG. 11 depicts an extended microwave mesh network with relay, in accordance with some examples of the present disclosure.

Applying relay site solution, searching, and evaluation of nearby one-hop relay sites can then be conducted, with the relay sites connecting stranded sites to existing AAV sites with microwave links. The microwave link can be LoS, nLoS, or NLoS. Related microwave link cost, capacity, and availability can be estimated, as discussed above. The above microwave mesh network with relay sites can then be extended, as shown in FIG. 11. To simplify analysis, initially there are no additional bid costs for the relay site and/or any existing AAV sites—i.e., only the cost for the microwave

TABLE 3

Relay site Information

| SITE_ID | REGION | MARKET | MICROWAVE STATUS | ADDRESS | CITY | ST | ZIP |
|---|---|---|---|---|---|---|---|
| XXXXXXX | WEST | PHOENIX | Stranded | Blk Rock S | Hope | AZ | 85348 |
| YYYYYYYY | WEST | PHOENIX | Stranded | 19 Sec, 3 T | Quartzsite | AZ | 85344 |
| ZZZZZZZZ | WEST | PHOENIX | Stranded | 29 Section | La Paz CoL | AZ | 85328 |

| SITE_ID | LATITUDE | LONGITUDE | SWITCH | Structure Height | AMSL | RAD Center |
|---|---|---|---|---|---|---|
| XXXXXXX | 33.59251 | −113.623 | TEMPAZN | 180 | — | 49 |
| YYYYYYYY | 33.66675 | −114.06 | TEMPAZN | 60 | — | 35 |
| ZZZZZZZZ | 33.56957 | −114.35 | TEMPAZN | 180 | — | 0 |

Using such location information (e.g., GIS data), the microwave link 810 can be evaluated to determine whether the microwave link 810 could potentially provide LoS, nLoS, or NLoS connectivity. The microwave link 810 between the relay site 802 and the AAV site 806 or stranded site 804 can be evaluated with the methods discussed below, links is considered. In other words, bids for other types of connections such as, for example, fiber connections, are not initially considered. Microwave links are needed, for example, to relay from site G to site E and from site E to site C. Of course, some stranded sites may have multiple choices for connecting to more than one nearby relay sites. For example, site C can utilize two microwave link connections (relay site E or relay site F), and then connect to existing AAV sites G and H, respectively.

AG-MST Algorithm for Backhaul Coverage Optimization

Examples of the present disclosure comprise a novel Adaptive-Graph Minimum Spanning Tree (AG-MST) algorithm to provide maximum backhaul coverage, with known capacity and link availability. The AG-MST includes several novel features over traditional MST algorithms including, but not limited to:

1) Starting point site selection: in this algorithm, not all sites can be a starting point. sites that do not have new fiber construction or relay site bids, for example, cannot act as starting points. Some sites may be too remote or rugged, for example, to make fiber installation practical. As a result, only sites with a vendor fiber bid or an AAV site that is already connected to stranded sites with a relay link are chosen as a possible starting point site. In FIG. 11, for example, sites A, D, G and H can serve as a starting point for building the AG-MST.

2) Depending on the starting point, the target network graph can be altered to show related sites, links, and associated weights (e.g., cost, capacity, and availability metrics).

3) From each starting point, a new link search algorithm can be used to obtain backhaul trees with minimum costs, while still satisfying backhaul capacity and availability requirements, as follows:

a. The capacity of each new backhaul link can be chosen to be equal to or larger than the total committed information rate (CIR)—i.e., the sum of the bandwidth requirements for all sites to which the link is connected:

$$\text{Capacity of the link} \geq \Sigma_{i=1}^{N}\text{CIR}(i),$$

where $C_l$ represents the capacity of the new microwave backhaul link, N is the total number of sites to which this link is to provide backhaul, and CIR(i) is the CIR bandwidth of site i. In some cases, an appropriate cushion can be chosen (e.g., 10% greater capacity than expected), for example, to provide extra capacity for peak usage and reliability.

b. For each new added backhaul link, the end-to-end backhaul availability can be chosen to be equal to or larger than the minimum backhaul availability threshold. The end-to-end availability can be calculated as:

$$A(s,s+N)=A(s,s+1)\times A(s+1,s+2)\times \ldots \times A(s+N-1,s+N)\geq A_{thr}$$

where s represents the start point site, s+N is the target site N links from the starting point site, s. Similarly, A(s, s+1) represents the link availability between the start point and the first point in the chain, (s+1, s+2) represents the link availability between the first point in the chain and the second point in the chain, and so on. Of course, various locations will utilize more or less relay sites to connect to an AAV. Finally, $A_{thr}$ represents the minimum acceptable backhaul availability threshold. Thus, the end-to-end availability can be determined by the multiplication of availability of each microwave link between site S and site S+N.

4) The starting point can be set as a stranded site, but one with an existing vendor fiber construction bid. In this case, the graph can be set starting with the stranded site cluster only. The link search algorithm can then be run on this cluster to determine a minimum cost spanning tree. The minimum cost spanning tree is chosen such that all associated microwave links (LoS/nLoS/NLOS) satisfy the capacity and availability requirements described in (3).

5) With the solutions from (4), the relay solution can be determined. The starting point can now be set to an existing AAV site, which can connect to a stranded site with one or more relay microwave links, as shown in FIG. 11. The AAV site and relay site can then be added to the stranded site cluster from (4). The search algorithm can be run again from the AAV site for the new extended cluster graph to get the minimum cost spanning tree. The algorithm identifies links in which all associated microwave link paths satisfy backhaul capacity and link availability requirements described in section (3) and discards others.

6) The algorithm can be run for each possible start-point site, following (4), (5), or both, to determine all possible minimum cost spanning tree solutions. The total cost of each solution can then be calculated. The solution with the minimum backhaul coverage cost is chosen (i.e., the solution with the minimum backhaul cost per site). In some cases, the average backhaul cost per site can be compared to a maximum cost set by the provider, or the "cost per site up-limit." In other words:

Minimize Stranded site backhaul coverage cost per site)

s.t average_cost_per_site≤cost_per_site_up_limit

7) If there are stranded sites remaining, steps 4-6 can be repeated until all sites are connected or the constraints cannot be satisfied. As discussed below, in some cases, no solution can be found to "unstrand" all sites. In these cases, the provider may choose to leave the sites stranded. These sites can be revisited when, and if, infrastructure updates occur that change the possible solutions.

As shown in FIG. 12A, site A can be selected as a starting point, which leads to:

Step 1: Set site A as starting point. Remove the cost to upgrade Site D (originally a $500K construction bid) because it will not work as starting point (hub) for new fiber construction.

Step 2: Start with the microwave links to nearby sites with minimum cost. Determine whether the chosen microwave link capacity can satisfy the aggregated site backhaul capacity requirement. In other words:

$$C\_MW(j)\geq O(N)\times \Sigma_N \text{CIR}(i)$$

where N is the total number of sites with backhaul traffic that is connected through microwave link j, and O( ) is an oversubscription factor. The oversubscription factor is set based on multiplexing gain, with a value range $0<O(N)\leq 1$. When N is 1, for example, O(N)=1 (because there is only one site). Otherwise, $0<O(N)<1$ and is a monotone decreasing function with site number N. In this step, a good estimation for O(N) is 0.9, which indicates a 10% bandwidth saving. The oversubscription is adopted due to multiplexing gain, which means not all links reach maximum utilization at the same time. As a result, some bandwidth is unused enabling the use of a link with a smaller capacity to backhaul total N number links. As shown in FIG. 12A, in this scenario, the minimum cost is from site A to site C ($30K) with a microwave link capacity of 150 Mbps. This link capacity is larger than the CIR capacity requirement of site C (i.e., 150 Mbps>100 Mbps). As a result, this connection can be marked as valid.

Step 3: As shown in FIG. 12B, the algorithm can continue searching and identifies a link from site C to site B, which also has a minimum cost ($30K). The CIR requirement of site B is 100 Mbps, however, and when site B added, the microwave link between A and C does not have the capacity for both sites. In other words, because the link between A and C (150 Mbps) is smaller than 0.9*(CIR_C+CIR_B), or 0.9*(100 Mbps+100 Mbps), the link is not selected.

Figure 12C:
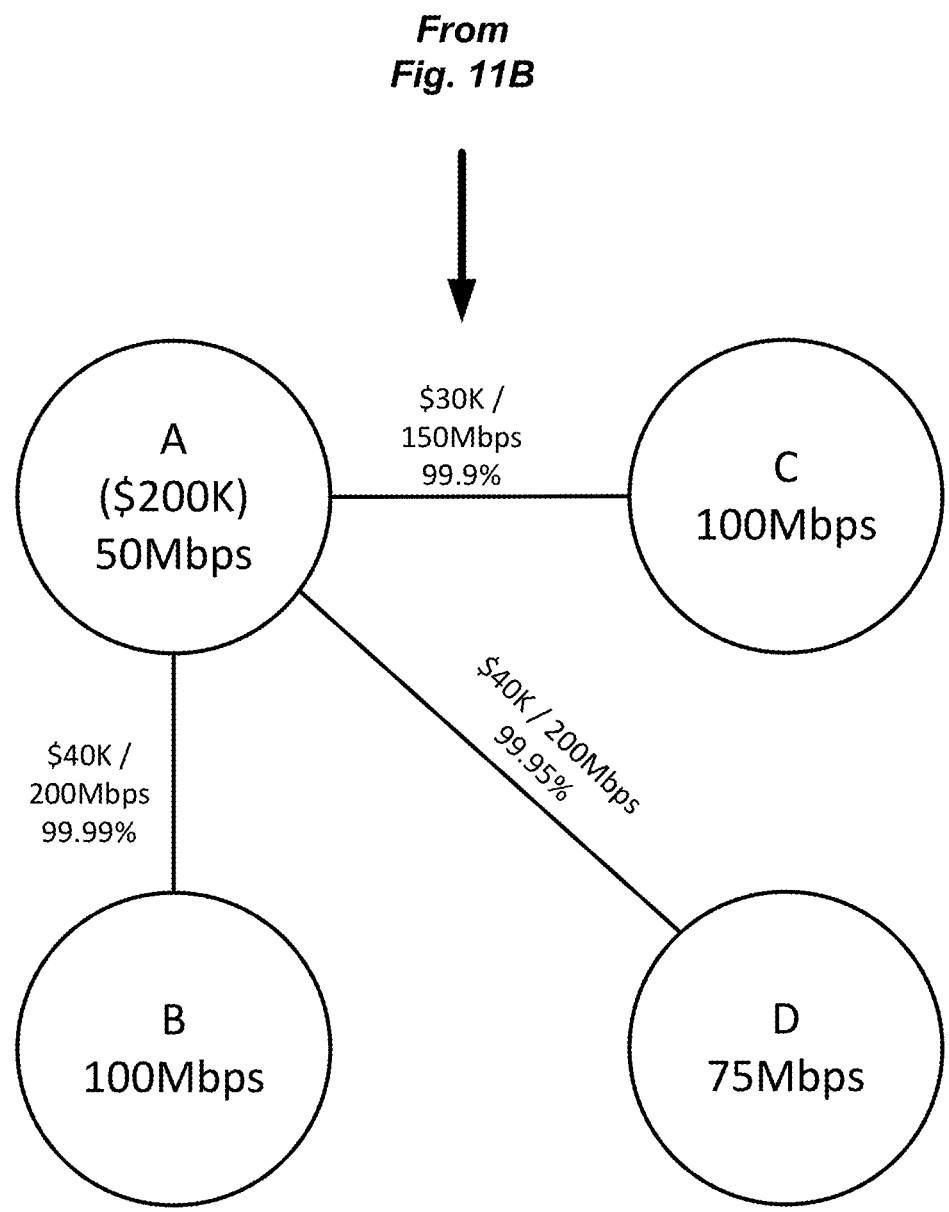

Step 4: As shown in FIG. 12C, the link between A and D has the next minimum cost ($40K), for which the microwave link capacity is 200 Mbps. This satisfies the backhaul capacity requirement of site D (75 Mbps). As a result, the path can be marked valid. Thus, the AG-MST can be completed for all four stranded sites, which results in a total cost of $300K ($200K+$30K+$40K+$40K), and an average cost per stranded site backhaul of $75K per site.

Similarly, if site D is selected as a starting point, then site A cost can be set to zero. The results for this configuration are shown in FIGS. 13A-13F. The total cost=$500K (site D)+$40K (link—site A to D)+$30K (link—site A to C)+$50K (link—site B to D)=$620K, and average cost per site is $155K ($620K/4).

Figure 14A:
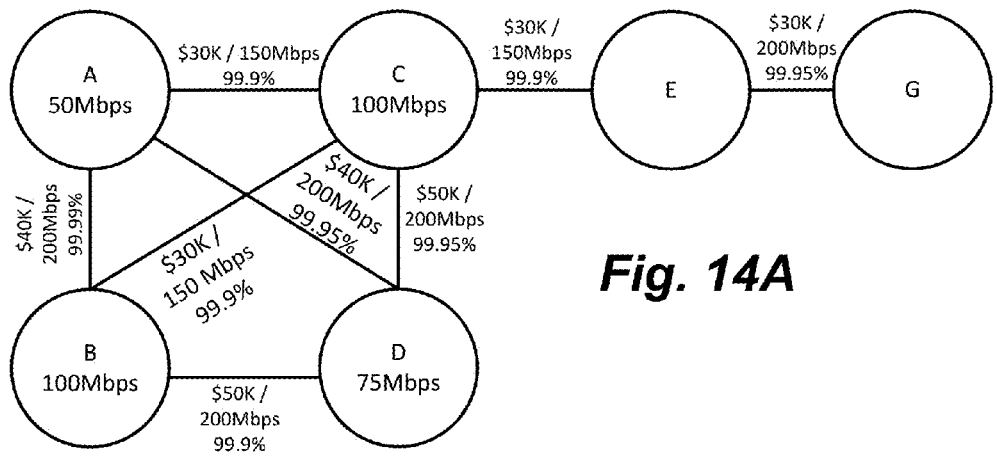
FIG. 14A-14E depicts an adjusted MST with starting point at site G with relay site E (first round), in accordance with some examples of the present disclosure.

Next, the relay solution can be calculated by starting from the other end of the cluster. Thus, site G can be selected as the starting point—which connects stranded site C with relay site E:

Step 1: As shown in FIG. 14A, the graph can be updated with relay sites by selecting AAV site G as a starting point and site E as the relay site. This enables the other relay site F and associated AAV site H to be removed. This also enables the bid costs associated with sites A and D to be removed.

Figure 14B:
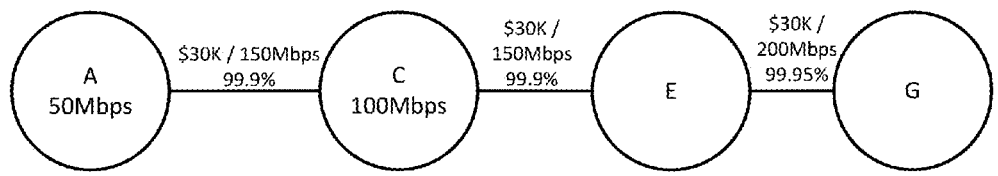
Figure 14C:
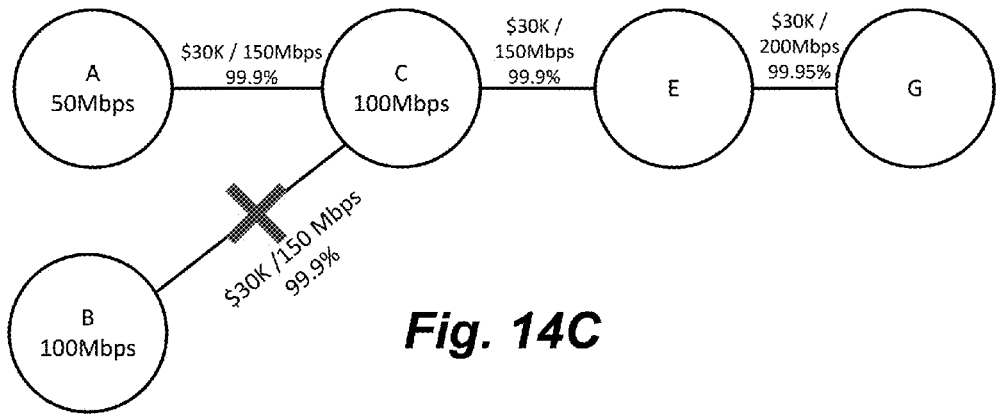

Step 2: As shown in FIG. 14B, site C can initially be connected to site A because it (1) represents the minimum cost and (2) satisfies the microwave link capacity requirements;

Step 3: As shown in FIG. 14C, site B can then be connected to site C. As before, this connection is chosen initially because it has the minimum cost. Unfortunately, this connection fails to satisfy the microwave link capacity requirements and is discarded.

Figure 14D:
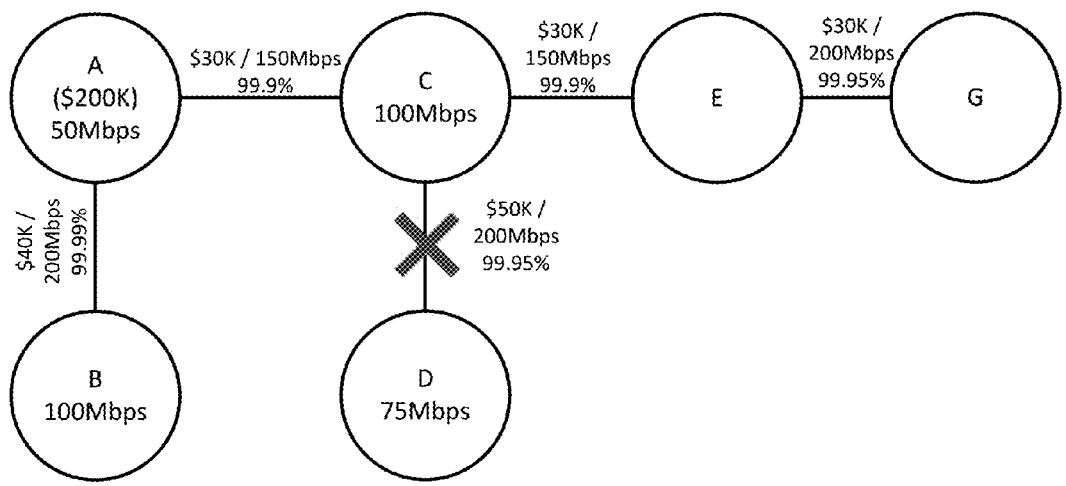

Step 4: As shown in FIG. 14D, site B can be connected to site A because it has the second lowest cost and satisfies the microwave link capacity requirement. Site D can then be connected to site C due to its lower cost. Unfortunately, a bottleneck appears at the microwave link between C and E (300 Mbps).

Figure 14E:
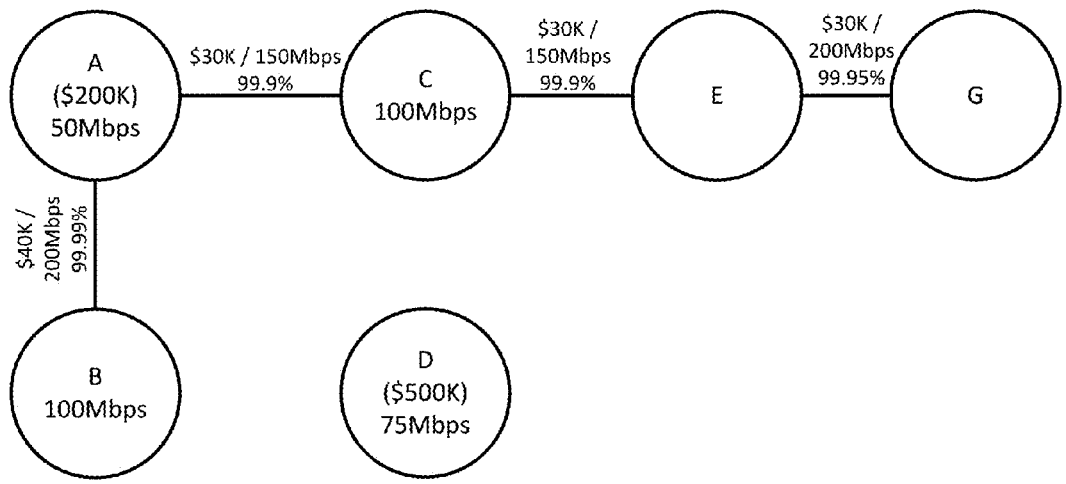

Step 4: As shown in FIG. 14E, because adding site D would increase the CIR to 325 Mbps (100 Mbps (site B)+50 Mbps (site A)+100 Mbps (site C)+75 Mbps (site D)), site D is still stranded.

The total cost for this solution—through relay site E—is $130K ($30K+$40K+$30K+$30K), and average cost per connected stranded site is $43.3K ($130K/3).

Figure 13A:
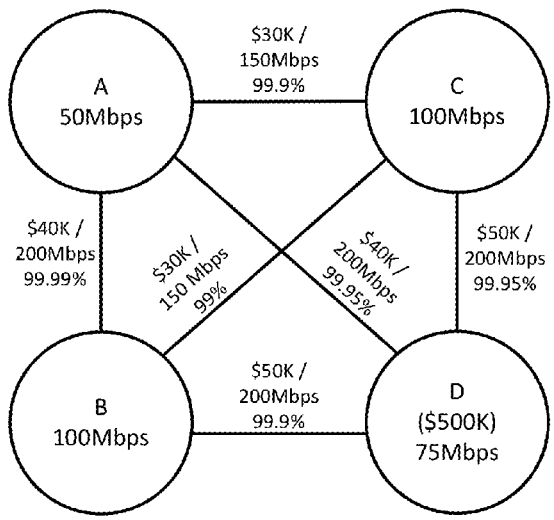
FIGS. 13A-13F depict an adjusted MST with a starting point at site D (first round), in accordance with some examples of the present disclosure.
Figure 13B:
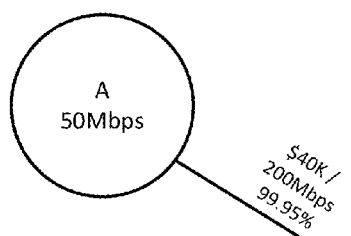
Figure 13C:
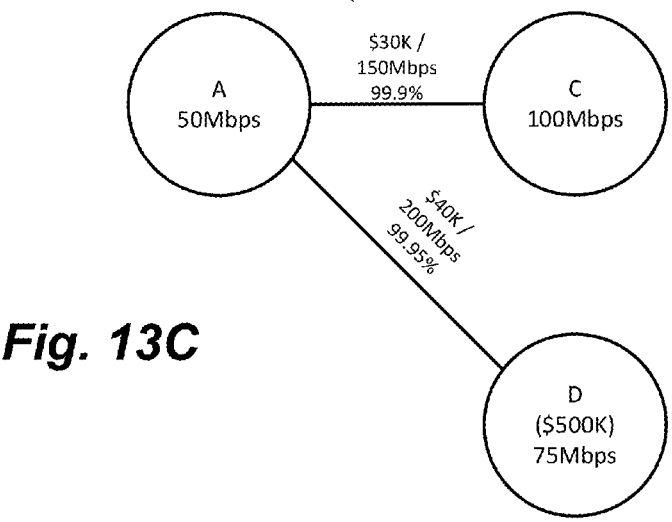
Figure 13D:
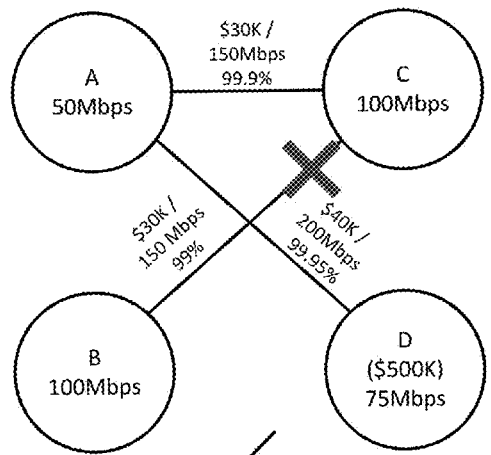
Figure 13E:
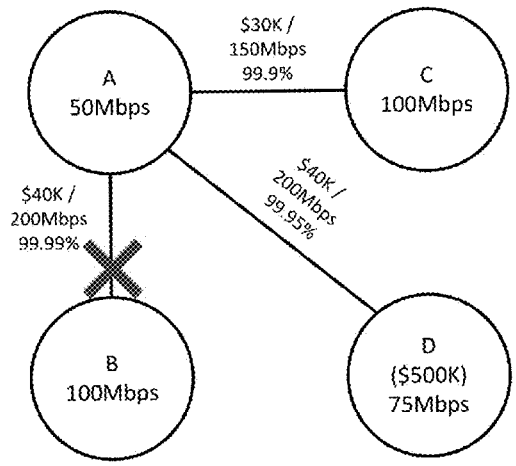
Figure 13F:
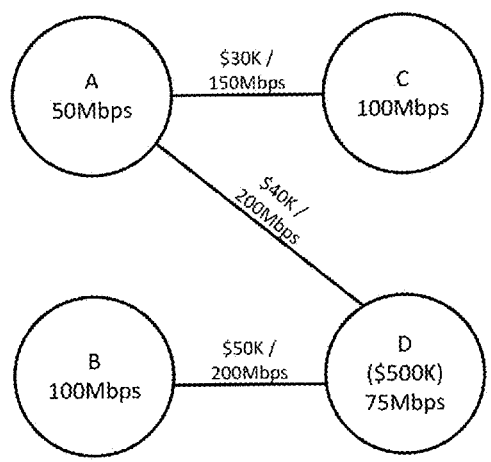
Figure 15A:
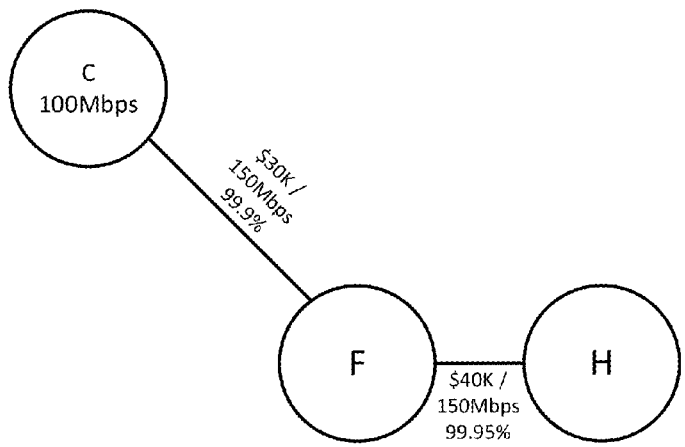
FIG. 15A-15C depict an adjusted MST with starting point at site H with relay site F (first round), in accordance with some examples of the present disclosure.
Figure 15B:
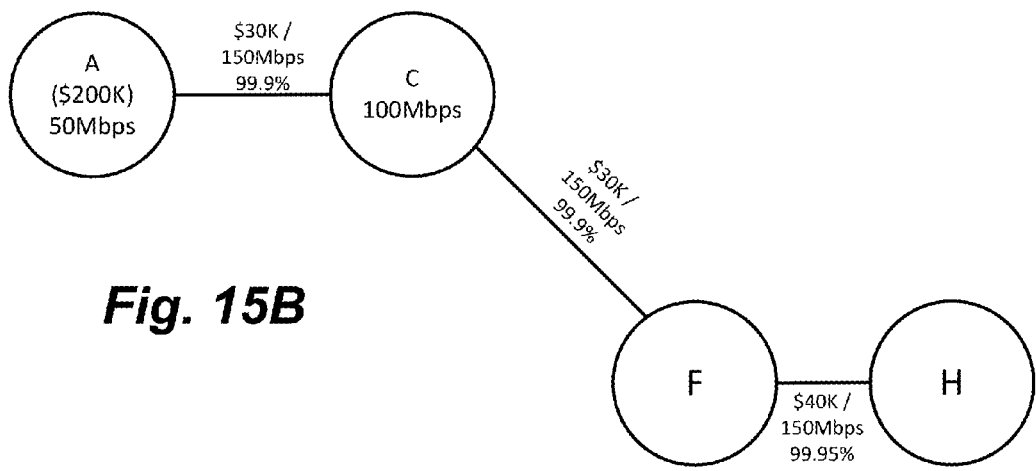
Figure 15C:
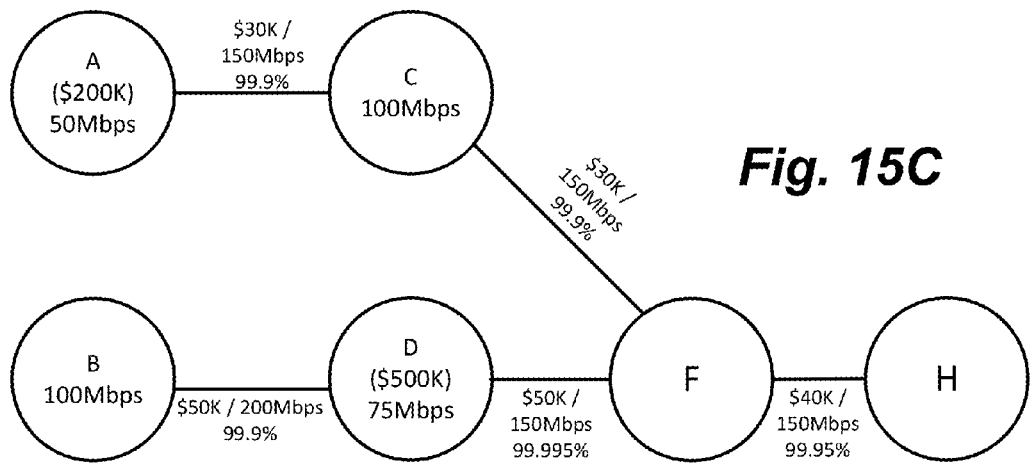

Similarly, as shown in FIGS. 15A-15C, an adjusted AG-MST with starting point at H and relay site F can be calculated. Please note that there are two possible relay links between site F and the stranded sites A and B (e.g., site C or site D), which provides more options on the MST graph. This analysis results in a total cost of $200K ($40K+$30K+$30K+$50K+$50K) and an average cost per connected stranded site of $50K ($200K/4). First-round AG-MST building with different starting points, therefore, results in the following cost metrics:

| MST Method | Total Backhaul Cost | Average Cost per Stranded site |
|---|---|---|
| FIG. 12C | 300K | 75K |
| FIG. 13F | 620K | 155K |
| FIG. 14E | 130K | 43.3K |
| FIG. 15C | 200K | 50K |

Figure 16A:
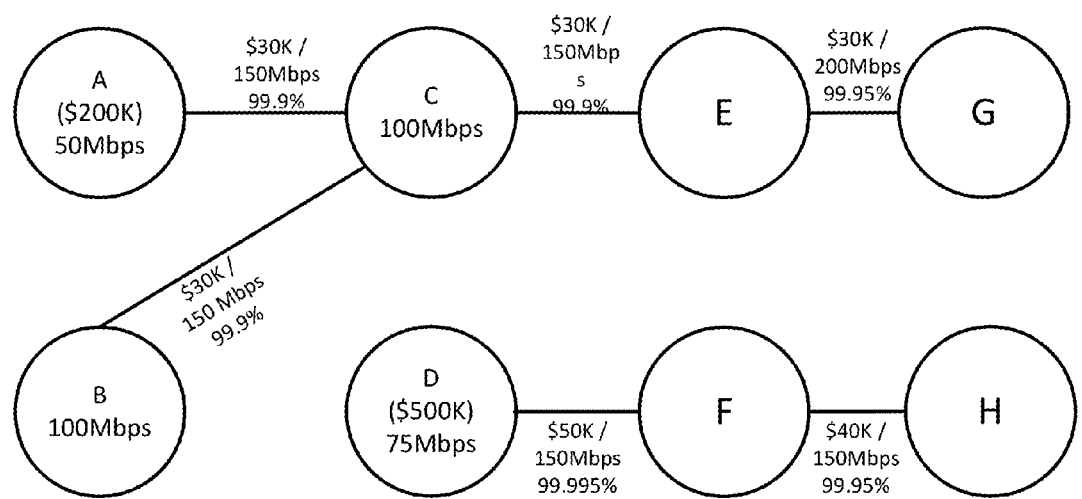
FIGS. 16A and 16B depict a site D connection with relay site (second round), in accordance with some examples of the present disclosure.
Figure 16B:
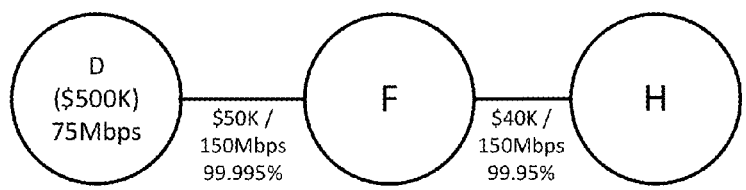

The solution can be chosen based on cost efficiency, i.e., minimum cost per stranded site, which leads to the solution in FIG. 14E. After the first round, therefore, the original graph from FIG. 14E is updated as shown in FIG. 16A. As shown in FIG. 16B, the total cost for stranded site D=$50K+$40K=$90K, with an average cost per stranded site of $90K ($90K/1 site (site D)).

In some cases, the average cost per site may be too high (i.e., above cost_per_ste_up_limit). If the average cost per site is higher than the limit, the solution can be discarded as unfeasible and the related sites can remain in stranded status for now. As infrastructure improvements occur over time, these stranded sites can be revisited for feasibility and possible upgrade.

In some examples, the AG-MST algorithm can be expressed as a computer-type algorithm:

1. Create a Graph G with mesh networking among stranded sites;
2. Extend Graph G with relay sites;
3. Update weights for each vertex and edge by identifying site new fiber bid cost and MW link cost;
4. Mark each potential starting point and update associated graph with weight;
5. For each round,
    Update stranded site cluster, by removing connected stranded sites.
    For each potential starting point:
Find out minimum weight spanning tree from the starting point, in which
    Each MW link capacity equal to or larger than aggregated site capacity &
    Associated End2End Availability equal to or larger than threshold availability;
If current link state cannot satisfy capacity or availability constraints, search for other link state $\{C_I, M_I, A_I\}$ that
can satisfy both the capacity and availability constraints;
    End
    Choose solution with minimum average cost per site,
        if the cost ≤MAX_COST_THRESHOLD
        (total budget)
        Otherwise Quit;
    End Cellular Coverage Flow and Automation Process Given the AG-MST backhaul optimization algorithm, a new business flow and automation process can be developed. The process can redefine how to use existing data sources, tools, rules, and engine running AG-MST algorithm to achieve maximum backhaul coverage with minimum cost. This is a significant improvement over conventional manual processes for backhaul planning and design.

Figure 17A:
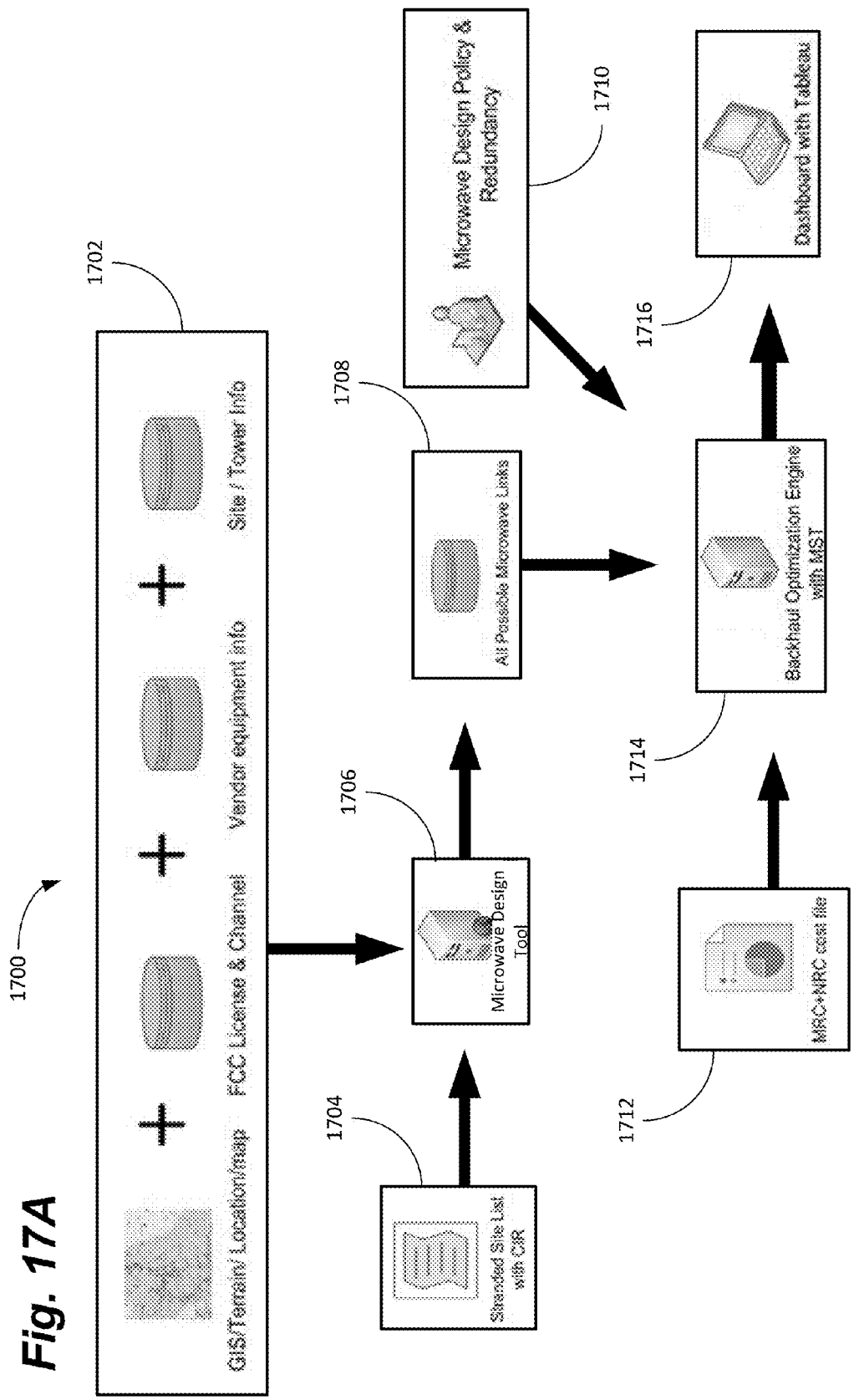
FIG. 17A is a business flowchart with backhaul optimization engine, in accordance with some examples of the present disclosure.
Figure 17B:
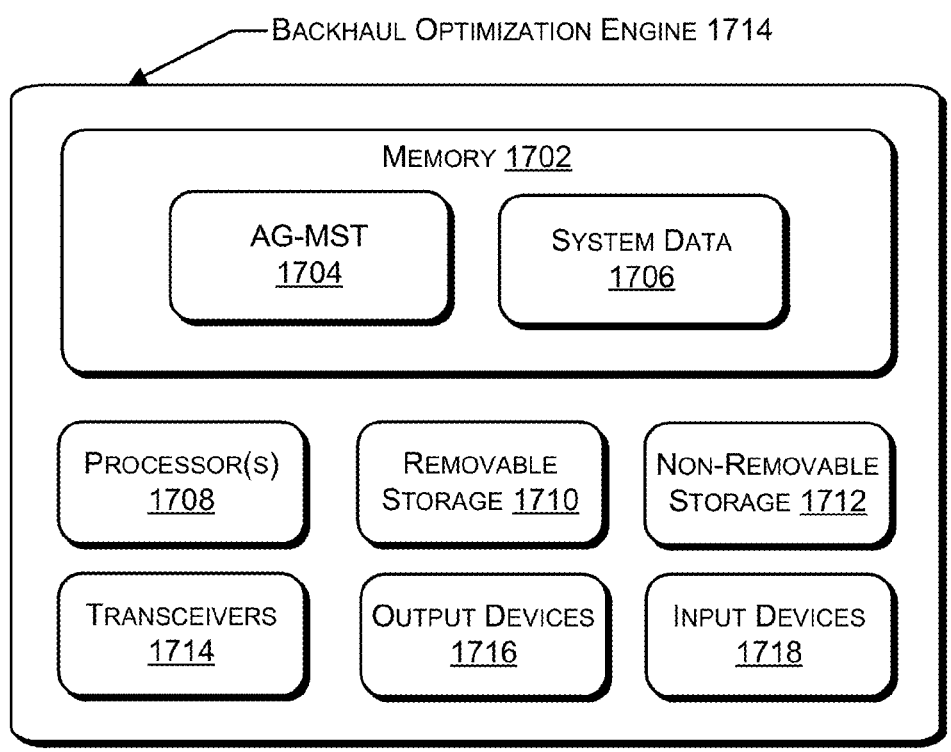
FIG. 17B is a schematic diagram of the backhaul optimization engine, in accordance with some examples of the present disclosure.

As shown in FIGS. 17A and 17B, examples of the present disclosure can also comprise a system 1700 for identifying backhaul solutions. As shown in FIG. 17A, in some examples, the system 1700 can include all necessary physical information 1702 for the cellular network. This can include, for example, all microwave site related information, including GIS/location info, FCC licensing information and nearby channel utilization, vendor equipment and frequency data, and nearby site/tower infrastructure information. The system 1700 can also comprise a list of all stranded sites 1704. The list of stranded sites 1704 can include information about the sites such as, for example, CIR, site locations, and site tower specifications.

In some examples, the system 1700 can utilize a microwave networking tool 1706. The networking tool 1706 can include, for example, third party microwave design tools that can provide LoS, nLoS, and NLoS P2P and mesh networking design for stranded sites. The system 1700 can also include all available microwave links 1708. The links 1708 can be evaluated with analysis tools. The system 1700 can also comprise tools that provide microwave design policy and redundancy 1710, which can combine, for example, CIR, design policy, cost metrics, and redundancy requirements for the network.

The system 1700 can also include a backhaul optimization engine 1714. The backhaul optimization engine can comprise a laptop, desktop, server, or other computer running the AG-MST algorithm 1718, discussed above. The AG-MST 1718 can provide a final, optimized design. In some examples, the final optimized design can be depicted graphically using a suitable graphic display tool 1716.

A component level view of the backhaul optimization engine 1714 is shown in FIG. 17B. As illustrated, the backhaul optimization engine 1714 can comprise a system memory 1720 storing the AG-MST 1718 and a system data 1722. Also, the backhaul optimization engine 1714 can include processor(s) 1724, a removable storage 1726, a non-removable storage 1728, transceivers 1730, output device(s) 1732, and input device(s) 1734.

In various implementations, system memory 1720 can be volatile (such as RAM), non-volatile (such as ROM, flash memory, etc.) or some combination of the two. The system data 1722 can include the data discussed above in a compiled form including, for example, the stranded site list 1704 and the list of possible microwave links 1708. System data 1722 can also include, for example, location and mapping information, tower height, tower transceiver information, and licensing information. In some implementations, the processor(s) 1724 can be a central processing unit (CPU), a graphics processing unit (GPU), or both CPU and GPU, or any other sort of processing unit.

The backhaul optimization engine 1714 may also include additional data storage devices (removable and/or non-removable) such as, for example, magnetic disks, optical disks, or tape. Such additional storage is illustrated in FIG. 17B by removable storage 1726 and non-removable storage 1728. Non-transitory computer-readable media may include volatile and nonvolatile, removable and non-removable tangible, physical media implemented in technology for storage of information, such as computer readable instructions, data structures, program modules, or other data.

System memory 1720, removable storage 1726 and non-removable storage 1728 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the backhaul optimization engine 1714. Any such non-transitory computer-readable media may be part of the backhaul optimization engine 1714.

In some implementations, the transceivers 1730 include any sort of transceivers known in the art. For example, the transceivers 1730 may include wired communication components, such as an Ethernet port, for communicating with other networked devices. Also or instead, the transceivers 1730 may include wireless modem(s) to may facilitate wireless connectivity with other computing devices. Further, the transceivers 1730 may include a radio transceiver that performs the function of transmitting and receiving radio frequency communications via an antenna.

In some implementations, the output devices 1732 include any sort of output devices known in the art, such as a display (e.g., a liquid crystal display), speakers, a vibrating mechanism, or a tactile feedback mechanism. Output devices 1732 also include ports for one or more peripheral devices, such as headphones, peripheral speakers, or a peripheral display.

In various implementations, input devices 1734 include any sort of input devices known in the art. For example, input devices 1734 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 18A:
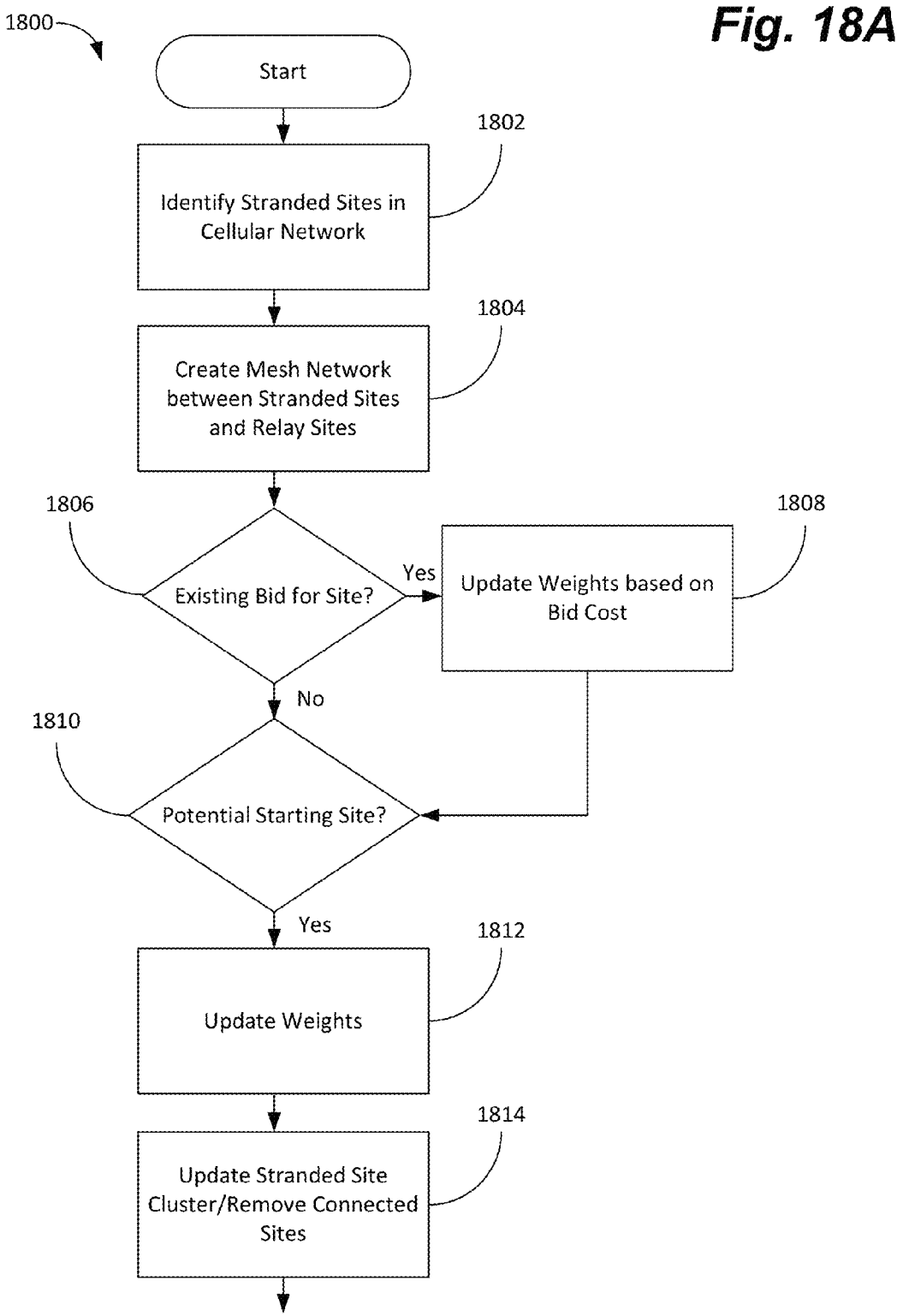
FIGS. 18A and 18B depict a flowchart for a method for optimizing cellular backhaul solutions, in accordance with some examples of the present disclosure.
Figure 18B:
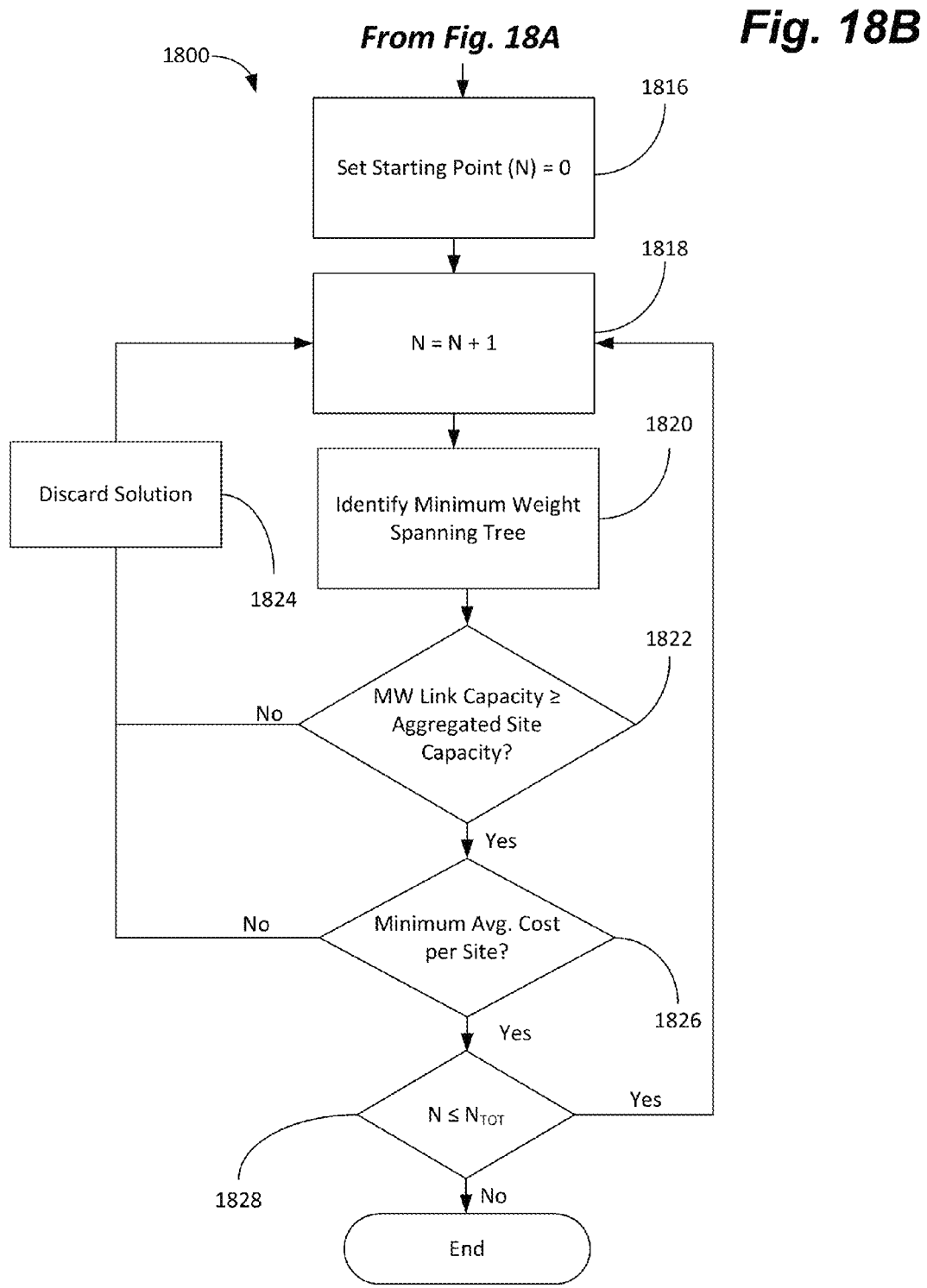

As shown in FIG. 18, examples of the present disclosure can also comprise a method 1800 for optimizing cellular backhaul solutions. At 1802, the method 1800 can include identifying stranded sites within the cellular network. As discussed above, this can include sites that do not have a physical network connection (e.g., fiber optic, T1, T3, etc.). Stranded sites can also include sites that do not have a microwave link to a relay site or directly to the backbone cellular network.

At 1804, a mesh network of stranded cites and relay sites can be created. The mesh network can include, for example, microwave link cost, bandwidth, and availability, among other things. At 1806, it can be determined whether sites have pending bids for updates. This can include the addition of microwave equipment, for example, or the addition of a fiber optic, or other physical, connection for which a vendor bid has been obtained. At 1808, if there are pending bids, the mesh network can be updated with weights based on the bid cost of the upgrade and the resulting bandwidth and availability.

At 1810, it can be determined if a site is a potential starting site. As mentioned above, only sites that have pending bids for upgrades or sites that have existing AAV connections can be used as starting sites because they have the potential to connect stranded sites to the network. Sites that cannot act as starting sites can be excluded from analysis.

At 1812, the chart can be updated with any changes in weights based on the chosen starting point. In other words, once a starting site is chosen, the weights of other potential starting sites can be removed (e.g., the bids for other sites can be set as zero for this round). At 1814, the mesh network can be updated based on the chosen starting site. In other words, as discussed above, choosing a particular stranded site may eliminate certain sites from analysis in the mesh network because no bid is in place to connect that site with the starting point. Similarly, choosing a particular AAV site as a starting site, for example, may eliminate another, parallel AAV site from analysis in the mesh network.

At 1816, the algorithm can begin with the starting point counter, N, set to zero. At 1818, N can be set to N=N+1, so that N=1 and the first starting site can be analyzed. In this manner, each starting point can be analyzed and then either kept or discarded based on the outcome of the analysis. At 1820, the minimum spanning tree for the first starting point can be found—i.e., the solution that connects the starting site to the network with the minimum weight (e.g., cost).

At 1822, the method 1800 can determine if the minimum spanning tree solution found above meets the minimum microwave link capacity. In other words, does the solution connect the starting point and all intervening points to the network and provide enough bandwidth to meet the needs the starting point and each intervening point. At 1824, of the solution does not meet this requirement, then that solution can be discarded and N can be incremented by one to analyze the next starting point solution.

At 1826, if, on the other hand, the solution does meet the microwave link capacity, then the solution can be analyzed to determine if it provides the minimum average cost per site. The first solution (N=1) will always produce the minimum cost because there are no additional solutions for comparison. As the algorithm cycles through the remainder of the solutions, however, the newest solution (e.g., N=4) can be compared to the previous minimum average cost solution (e.g., N=2).

If the newest solution does not represent the minimum average, at 1824, it can be discarded. At 1818, the solution number can be incremented by one and the algorithm continues. At 1828, of the newest solution does represent the lowest average cost per site, then that solution can be retained. At 1828, if N is less than or equal to the total number of solutions for the mesh network, $N_{TOT}$, the algorithm can continue. If, on the other hand, all solutions have been analyzed, the algorithm can end and the remaining solution represents the solution that meets the minimum microwave link capacity and the minimum average cost per stranded site. Of course, as mentioned above, some mesh networks may not have solutions for all stranded sites.

While several possible examples are disclosed above, examples of the present disclosure are not so limited. For instance, while systems and methods for use with cellular phone systems has been disclosed, other systems or subsystems could be analyzed in a similar manner without departing from the spirit of the disclosure. In addition, the location and configuration used for various features of examples of the present disclosure such as, for example, the order of steps, the types of cellular technologies, and the types of connections analyzed can be varied according to a particular network or application that requires a slight variation due to, for example, the size or construction of the network, the communication protocols, or the UEs used. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

Terms and Definitions

3G/4G—Third- and Fourth-Generation Cellular Networks
BER—Bit Error Rate
CAPEX—Capital expenditure
CIR—Committed Information Rate
DL—Downlink traffic from MSO through Carrier towards a cell site.
E-OAM—Ethernet OAM functions including monitoring, error reporting, loop-back support, etc.
FCC—Federal Communications Commission
FDD—Frequency-Division Duplexing
IDU—Indoor Unit
IP—Internet Protocol
ITU—International Telecommunications Union
LOS—Line-of-Sight
LTE—Long Term Evolution
MRC—Monthly Recurring Cost
MSO—Mobile Switch Office
NLoS—Non Line-of-Sight
nLoS—Near Line-of-Sight
NRC—Non-Recurring Cost
ODU—Outdoor Unit
OPEX—Operating expenditure
PE—Provider Edge Router used in IP/MPLS networks
PSTN—Public Switched Telephone Network
QAM—Quadrature Amplitude Modulation
QPSK—Quadrature Phase Shift Keying
RF—Radio Frequency
SNR—Signal-to-Noise Radio
UL—Uplink traffic from cell site through Carrier towards MSO
WDM—Wavelength-Division Multiplexing

The invention claimed is:

1. One or more non-transitory computer-readable media storing computer-executable instructions that, when executed on one or more processors, perform acts comprising:
   identifying stranded sites in a cellular communication system;
   creating a stranded site cluster comprising a mesh network graph between stranded sites and relay sites for a portion of a network;
   updating weights for each vertex and edge for which there is an associated bid cost;
   identifying a first potential starting point in the stranded site cluster;
   updating the stranded site cluster by removing connected stranded sites;
   identifying a first, minimum weight spanning tree solution for the first potential starting point;
   determining that each microwave link capacity in the first, minimum weight spanning tree solution is equal to, or larger than, an aggregated site capacity; and
   determining that an end-to-end backhaul availability is equal to or larger than a minimum backhaul availability threshold.

2. The one or more non-transitory computer-readable media of claim 1, the acts further comprising:
   determining that the first solution represents a minimum average cost per stranded site.

3. The one or more non-transitory computer-readable media of claim 2, further comprising:
   identifying a second potential starting point in the stranded site cluster;
   updating the stranded site cluster by removing connected stranded sites;
   identifying a second, minimum weight spanning tree solution for the second potential starting point;
   determining that each microwave link capacity in the second, minimum weight spanning tree solution is equal to, or larger than, the aggregated site capacity;
   determining that the second solution represents the minimum average cost per stranded site; and
   discarding the first solution.

4. The one or more non-transitory computer-readable media of claim 1, the acts further comprising:
determining that the first solution cost is below a predetermined threshold cost.

5. The one or more non-transitory computer-readable media of claim 1, wherein the associated bid cost comprises adding a fiber optic connection to the first potential starting point.

6. The one or more non-transitory computer-readable media of claim 1, wherein the associated bid cost comprises adding a microwave link connection to the first potential starting point.

7. The one or more non-transitory computer-readable media of claim 1, wherein the weights for each vertex and edge comprise at least one of bandwidth, cost, and availability.

8. The one or more non-transitory computer-readable media of claim 1, wherein the mesh network graph between stranded sites and relay sites comprises a plurality of line-of-site (LoS), near-line-of-site (nLoS), and non-line-of-site (NLoS) point-to-point (P2P) connections.

9. The one or more non-transitory computer-readable media of claim 1, wherein the mesh network graph between stranded sites and relay sites comprises at least one item of physical information for at least one of the stranded sites or at least one of the relay sites.

10. A method comprising:
identifying stranded sites in a cellular communication system;
creating a stranded site cluster comprising a mesh network graph between at least one stranded site and at least one relay site for a portion of a network;
updating weights for each vertex and edge for which there is an associated bid cost;
identifying one or more potential starting points in the stranded site cluster;
updating the stranded site cluster by removing connected stranded sites;
identifying a first, minimum weight spanning tree solution for each of the one or more potential starting points;
determining that each microwave link capacity in the first, minimum weight spanning tree solution is equal to, or larger than, an aggregated site capacity; and
determining that an end-to-end backhaul availability is equal to or larger than a minimum backhaul availability threshold.

11. The method of claim 10, further comprising:
determining a solution in the first subset that provides a minimum average cost per stranded site.

12. The method of claim 10, wherein the associated bid cost comprises a contractor bid to add a fiber optic connection to at least one of the stranded sites.

13. The method of claim 10, wherein the associated bid cost comprises a contractor bid to add a microwave connection to at least one of the stranded sites.

14. The method of claim 10, wherein the at least one relay site comprises a site with an existing microwave link.

15. The method of claim 10, wherein the at least one relay site comprises a site with an existing alternative access vendor (AAV) connection.

16. A backhaul optimization engine comprising:
a processor;
system memory; and
an adaptive graph minimum spanning tree (AG-MST) algorithm to:
identify stranded sites in a cellular communication system;
create a stranded site cluster comprising a mesh network graph between at least one stranded site and at least one relay site for a portion of a network;
update weights for each vertex and edge for which there is an associated bid cost;
identify one or more potential starting points in the stranded site cluster;
update the stranded site cluster by removing connected stranded sites;
identify a first, minimum weight spanning tree solution for each of the one or more potential starting points;
determine that each microwave link capacity in the first, minimum weight spanning tree solution is equal to, or larger than, an aggregated site capacity; and
determine that an end-to-end backhaul availability is equal to or larger than a minimum backhaul availability threshold.

17. The backhaul optimization engine of claim 16, wherein the AG-MST algorithm is further to:
determine a solution that provides a minimum average cost per stranded site.

18. The backhaul optimization engine of claim 16, wherein the associated bid cost comprises a contractor bid to add at least one of a fiber optic connection and a microwave link to at least one of the stranded sites.

* * * * *